(12) United States Patent
Sytnik

(10) Patent No.: US 12,136,190 B2
(45) Date of Patent: *Nov. 5, 2024

(54) SYSTEMS AND METHODS FOR SELECTIVE ENHANCEMENT OF OBJECTS IN IMAGES

(71) Applicant: Shinyfields Limited, Nicosia (CY)

(72) Inventor: Dmitry Sytnik, Kyiv (UA)

(73) Assignee: Shinyfields Limited, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,378

(22) Filed: May 15, 2023

(65) Prior Publication Data
US 2023/0281767 A1    Sep. 7, 2023

Related U.S. Application Data

(63) Continuation of application No. 16/951,908, filed on Nov. 18, 2020, now Pat. No. 11,651,480.

(Continued)

(51) Int. Cl.
*G06T 5/30*    (2006.01)
*G06F 3/0482*   (2013.01)
(Continued)

(52) U.S. Cl.
CPC .............. *G06T 5/30* (2013.01); *G06F 3/0482* (2013.01); *G06F 3/04845* (2013.01); *G06T 5/50* (2013.01);
(Continued)

(58) Field of Classification Search
CPC  G06T 5/30; G06T 5/002; G06T 5/009; G06T 5/50; G06T 2207/10024; G06T 2207/20084; G06T 2207/20212; G06T 2207/20221; G06T 5/001; G06T 11/60; G06T 3/4046; G06T 9/002; G06T 2207/20076; G06T 2207/20081; G06F 3/0482; G06F 3/04845; G06F 3/04847; G06F 3/0486; G06K 9/6223; G06K 9/627; G06K 7/1482; G06V 10/454; G06V 10/764; G06V 10/54; G06V 10/774; G06V 10/82; G06V 30/18057; G06N 3/02;
(Continued)

(56) References Cited

U.S. PATENT DOCUMENTS 10,664,963 B1 * 5/2020 Rossi ..................... G06V 10/82
11,158,055 B2 * 10/2021 Lin ........................... G06T 7/10
(Continued)

*Primary Examiner* — Jose L Couso
(74) *Attorney, Agent, or Firm* — Brown Rudnick LLP

(57) ABSTRACT

Exemplary embodiments are directed to a system for selective enhancement of an object in an image. The system includes an interface configured to receive as input an original image, and a processing device in communication with the interface. The processing device is configured to process the original image using a neural network to detect one or more objects in the original image, generate a neural network mask of the original image for the one or more objects in the original image, apply one or more enhancements to the objects associated with the neural network mask, the one or more modules generating an enhanced image including the one or more enhancements to the objects, and generate a combined image, the combined image including the original image combined with the one or more enhancements to the objects of the enhanced image.

20 Claims, 26 Drawing Sheets

Related U.S. Application Data

(60) Provisional application No. 62/936,856, filed on Nov. 18, 2019.

(51) Int. Cl.
*G06F 3/04845* (2022.01)
*G06T 5/50* (2006.01)
*G06T 5/70* (2024.01)
*G06T 5/92* (2024.01)

(52) U.S. Cl.
CPC .................. *G06T 5/70* (2024.01); *G06T 5/92* (2024.01); *G06T 2207/10024* (2013.01); *G06T 2207/20084* (2013.01); *G06T 2207/20212* (2013.01)

(58) Field of Classification Search
CPC ........... G06N 3/08–088; G06N 3/0445; G06N 3/0454; G06N 3/4046; G06N 7/00; G06N 20/00; Y10S 128/925
See application file for complete search history.

(56) References Cited

U.S. PATENT DOCUMENTS

| | | | |
|---|---|---|---|
| 2018/0260668 A1* | 9/2018 | Shen | G06V 10/82 |
| 2019/0147221 A1* | 5/2019 | Grabner | G06T 7/75 |
| | | | 382/103 |
| 2019/0347801 A1* | 11/2019 | Ellison | G06T 7/174 |
| 2020/0302656 A1* | 9/2020 | Kumar | G06T 5/92 |
| 2021/0142479 A1* | 5/2021 | Phogat | G06T 11/206 |

* cited by examiner

SYSTEMS AND METHODS FOR SELECTIVE ENHANCEMENT OF OBJECTS IN IMAGES

CROSS-REFERENCE TO RELATED APPLICATIONS

The present application is a continuation application of U.S. Nonprovisional application Ser. No. 16/951,908, filed Nov. 18, 2020, which claims the benefit of priority to U.S. Provisional Application No. 62/936,856, filed Nov. 18, 2019, the content of each of which is hereby incorporated by reference in their entireties.

TECHNICAL FIELD

The present disclosure relates generally to computer-based systems and methods for altering or editing digital images. More specifically, the present disclosure relates to systems and methods for selective enhancement of objects in images, in order to generate a realistic and improved image in an efficient manner.

BACKGROUND

Although the quality of photographs captured by cameras has improved over time, in some instances, cameras may not be able to correctly perceive colors and/or brightness in a wide dynamic range during photography. As such, certain objects in the captured image (e.g., the sky in the background) may appear brighter than other objects (e.g., items or structures in the foreground). Because the sky or background can significantly affect the appearance of an image, particularly in commercial and/or artistic photography, it may be desirable to adjust or enhance the colors and/or brightness of the sky after the image has been captured. The process of such adjustment or enhancement is generally not automatic, and often requires a wide range of different image editing tools to achieve the desired result. As an example, some software may allow for manual adjustment of shadows, highlights, curves, high-dynamic-range (HDR), gradient adjustments, combinations thereof, or the like.

In addition, traditional software generally applies the adjustments or enhancements to the entire image, thereby affecting both the sky and the remaining portions of the image. Improving the sky can therefore result in damage or undesired effects to the remaining portions of the image. Traditional software often requires advanced skills to properly determine which tools to use depending on the type of scene and/or the type of sky in the image. Traditional software also does not allow for batch mass processing on various images (e.g., copying applied adjustments or enhancements to other images).

A need exists for systems and methods for selective enhancement of objects in images that allow for an automatic and efficient process of enhancement of the objects in images having varying complexities. The systems and methods of the present disclosure solve these and other needs.

SUMMARY

In accordance with embodiments of the present disclosure, an exemplary system for selective enhancement of an object in an image is provided. The system includes an interface configured to receive as input an original image, and a processing device in communication with the interface. The processing device can be configured to process the original image using a neural network to detect one or more objects in the original image, and generate a neural network mask of the original image for the one or more objects in the original image. The processing device can be configured to apply one or more enhancements to the objects associated with the neural network mask, the one or more modules generating an enhanced image including the one or more enhancements to the objects. The processing device can be configured to generate a combined image, the combined image including the original image combined with the one or more enhancements to the objects of the enhanced image.

In some embodiments, the original image can include a foreground and a background. In such embodiments, the one or more objects can include the background of the original input. In some embodiments, the one or more objects can include a sky in the original image. In some embodiments, the processing device can determine a category type of the sky in the original image. The category type can include at least one of a blue day sky, a sunset sky, a dawn sky, a cloudy sky, a stormy sky, a night sky, or a foggy sky.

The processing device can generate a refined mask for each pixel of the original image associated with the background. The processing device can generate a blurred mask, the blurred mask including a blur along a border extending between the foreground and the background. The processing device can generate a dilated or indented mask, the dilated mask including a dilation or indentation from a border extending between the foreground and the background. The processing device can generate an interpolation grid, the interpolation grid corresponding to the foreground. In some embodiments, the one or more enhancements can be applied to the objects associated with the neural network mask are applied to the background independently from the foreground of the original image. In some embodiments, the one or more enhancements can be applied to the objects associated with the neural network mask are applied to the background without affecting the foreground of the original image.

Applying the one or more enhancements can include generating a brightness corrected image including brightness enhancement of the original image, and/or generating a contrast corrected image including contrast enhancement of the original image. The processing device can generate a saturation corrected image including saturation enhancement of the original image. The processing device can generate a color improved image including color enhancement of the original image. The processing device can generate a reduced noise image by reducing noise associated with a night sky in the original image. The processing device can determine whether pixels in the neural network mask have a luminosity value above, below or equal to a luminosity threshold value. If the luminosity value of a pixel in the neural network mask is equal to or above the luminosity threshold value, the one or more enhancements can be fully applied to the pixel. If the luminosity value of the pixel in the neural network mask is below the luminosity threshold value, the one or more enhancements are not applied to the pixel or are applied at a reduced strength to the pixel.

In some embodiments, the interface can include an image selection section with the combined image and one or more additional original images. The interface can include a first submenu for selecting the combined image and copying the one or more enhancements applied to the combined image. The interface can include a second submenu for selecting one or more of the additional original images and applying the copied one or more enhancements of the combined image to the selected one or more of the additional original images.

In accordance with embodiments of the present disclosure, an exemplary method for selective enhancement of an object in an image is provided. The method includes receiving as input at an interface an original image, detecting one or more objects in the original image with a neural network, and generating a neural network mask of the original image for the one or more objects in the original image. The method includes applying one or more enhancements to the objects associated with the neural network mask, the one or more modules generating an enhanced image including the one or more enhancements to the objects. The method includes generating a combined image, the combined image including the original image combined with the one or more enhancements to the objects of the enhanced image.

In accordance with embodiments of the present disclosure, an exemplary non-transitory computer-readable medium storing instructions at least for selective enhancement of an object in an image is provided. The instructions are executable by a processing device. Execution of the instructions by the processing device can cause the processing device to receive as input at an interface an original image, detect one or more objects in the original image with a neural network, and generate a neural network mask of the original image for the one or more objects in the original image. Execution of the instructions by the processing device can cause the processing device to apply one or more enhancements to the objects associated with the neural network mask, the one or more modules generating an enhanced image including the one or more enhancements to the objects. Execution of the instructions by the processing device can cause the processing device to generate a combined image, the combined image including the original image combined with the one or more enhancements to the objects of the enhanced image.

Other features and advantages will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

To assist those of skill in the art in making and using the disclosed systems and methods for selective enhancement of objects in images, reference is made to the accompanying figures, wherein.

DETAILED DESCRIPTION

In accordance with embodiments of the present disclosure, exemplary systems for selective enhancement of objects in images are provided to generate an improved and realistic output image. As an example, the exemplary systems can be used to enhance the sky in an input image, with the output image providing no indication of enhancement of the original sky. The exemplary systems generate an object mask (e.g., neural network mask) using a neural network to identify the object (e.g., background sky) to be replaced in the image, refine the object mask to ensure all or substantially all pixels of the sky are captured within the object mask, blur edges of the object mask to hide mask inaccuracies, apply one or more enhancements to the object identified in the object mask, and combine the enhanced sky with the original image. Although discussed herein as being used to enhance the sky of an image, it should be understood that the exemplary systems can be used to identify/detect and enhance any object(s) in the image.

Figure 1:
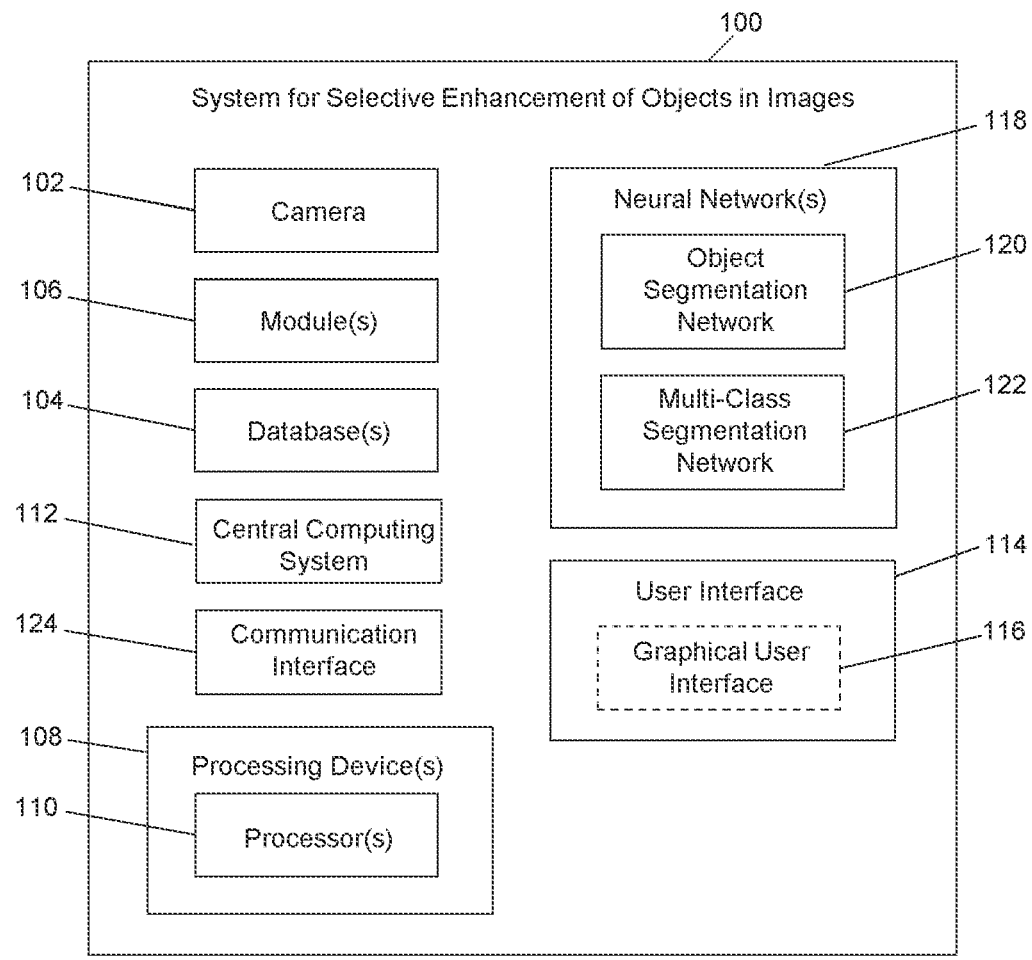
FIG. 1 is a block diagram of an exemplary system for selective enhancement of objects in images in accordance with the present disclosure.

FIG. 1 is a block diagram of an exemplary system 100 for selective enhancement of objects in images (hereinafter "system 100"). The system 100 includes one or more cameras 102 capable of capturing one or more digital images that can be received as input images by the system 100. The system 100 includes one or more databases 104 configured to receive and electronically store data corresponding to operation of the system 100, including data corresponding to images received, edited and/or enhanced by the system 100. The system 100 includes software units or modules 106 configured to be executed by a processing device 108 to edit, adjust and/or enhance one or more portions/objects of the input images. The processing device 108 can include one or more processors 110 for executing the modules 106.

The system 100 can include a central computing system 112 for controlling the steps performed by the system 100. In some embodiments, the central computing system 112 can include the one or more processing devices 108. The system 100 can include a user interface 114 (e.g., a device with a user interface), such as a user interface having a graphical user interface (GUI) 116. The GUI 116 can be used to input data and/or instructions into the system 100, and to output data and/or images to the user.

The system 100 can include one or more neural networks 118 executed by the processing device 108. The neural network 118 can include an object segmentation network 120 and a multi-class segmentation network 122. The network 118 can be trained via, e.g., manual input, machine learning, historical data input and analysis, combinations thereof, or the like, with sample images to assist in one or more steps of the process performed by the system 100. For example, the network 118 can be trained with sample images to detect and segment specific objects in input images. In one embodiment, the network 118 can be trained to recognize pixels in the input image that correspond with the sky (or with a high probability of corresponding with the sky). The networks 118 used can be small and fast to ensure efficient processing of the images within the system 100. The object segmentation network 120 can be selected to precisely segment objects (e.g., the sky) from the original image and to use quantization weights to reduce the size of the network.

In some embodiments, the object segmentation network 120 can be used to identify and segment the object to be enhanced in the original image (e.g., the sky). The multi-class segmentation network 122 can include a dataset with a large number of classes (e.g., trees, humans, buildings, or the like) to identify and segment specific objects in the original image to ensure a realistic overall adjustment to the original image. The system 100 can include a communication interface 124 configured to provide communication and/or transmission of data between the components of the system 100 shown in FIG. 1.

Figure 2:
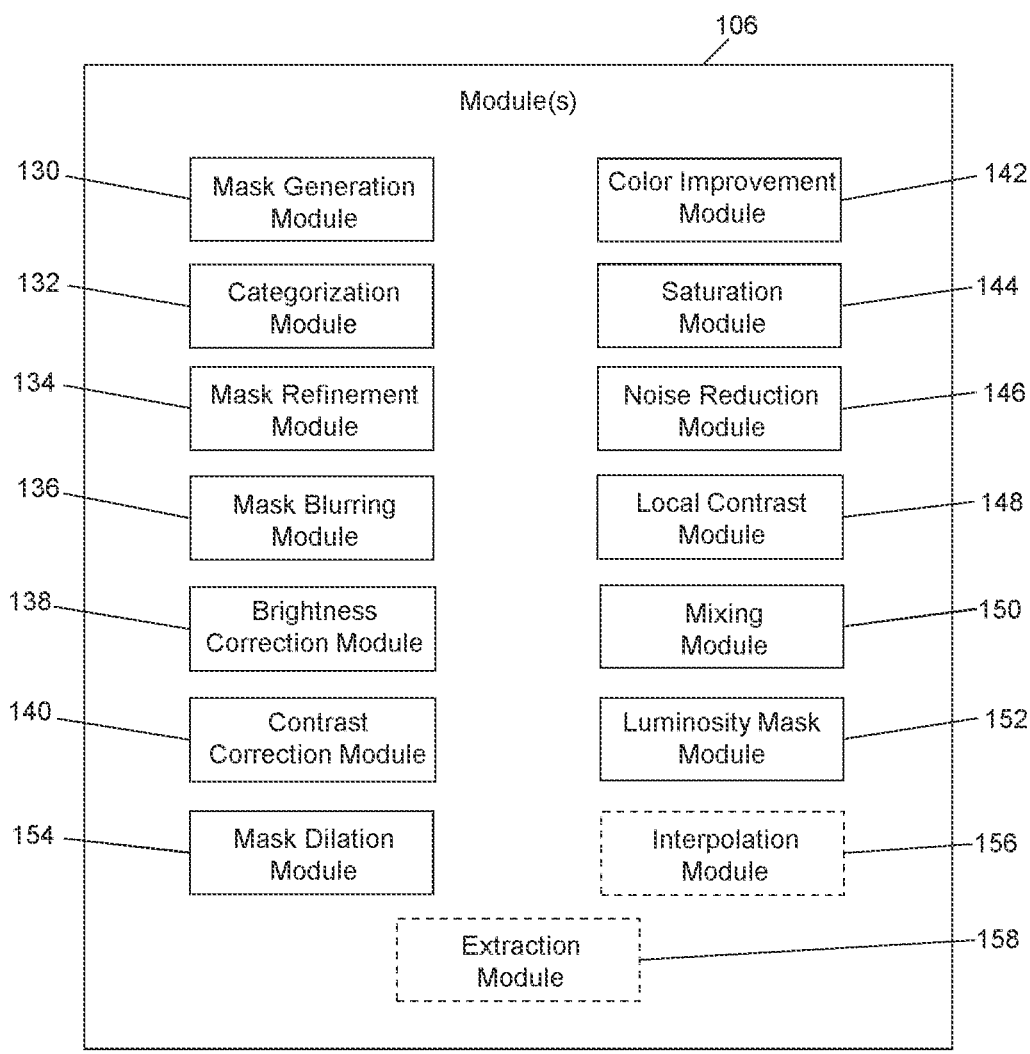
FIG. 2 is a block diagram of exemplary modules of a system for selective enhancement of objects in images in accordance with the present disclosure.

FIG. 2 is a block diagram illustrating the software modules 106 of the system 100 in greater detail. Although illustrated as separate modules, in some embodiments, the modules can be combined or separated into one or more modules. For example, the modules can be combined into a single module and/or any of the modules can be distributed in the system 100. In some embodiments, the system 100 can include, e.g., a mask generation module 130, a categorization module 132, a mask refinement module 134, a mask dilation module 154, a mask blurring module 136, a brightness correction module 138, a contrast correction module 140, a color improvement module 142, a saturation module 144, a noise reduction module 146, a local contrast module 148, a mixing module 150, and a luminosity mask module 152. In some embodiments, the modules 106 can include an interpolation module 156, and an extraction module 158. Execution and operation of each of the modules 106 will be discussed in detail below with reference to sample images.

Figure 3:
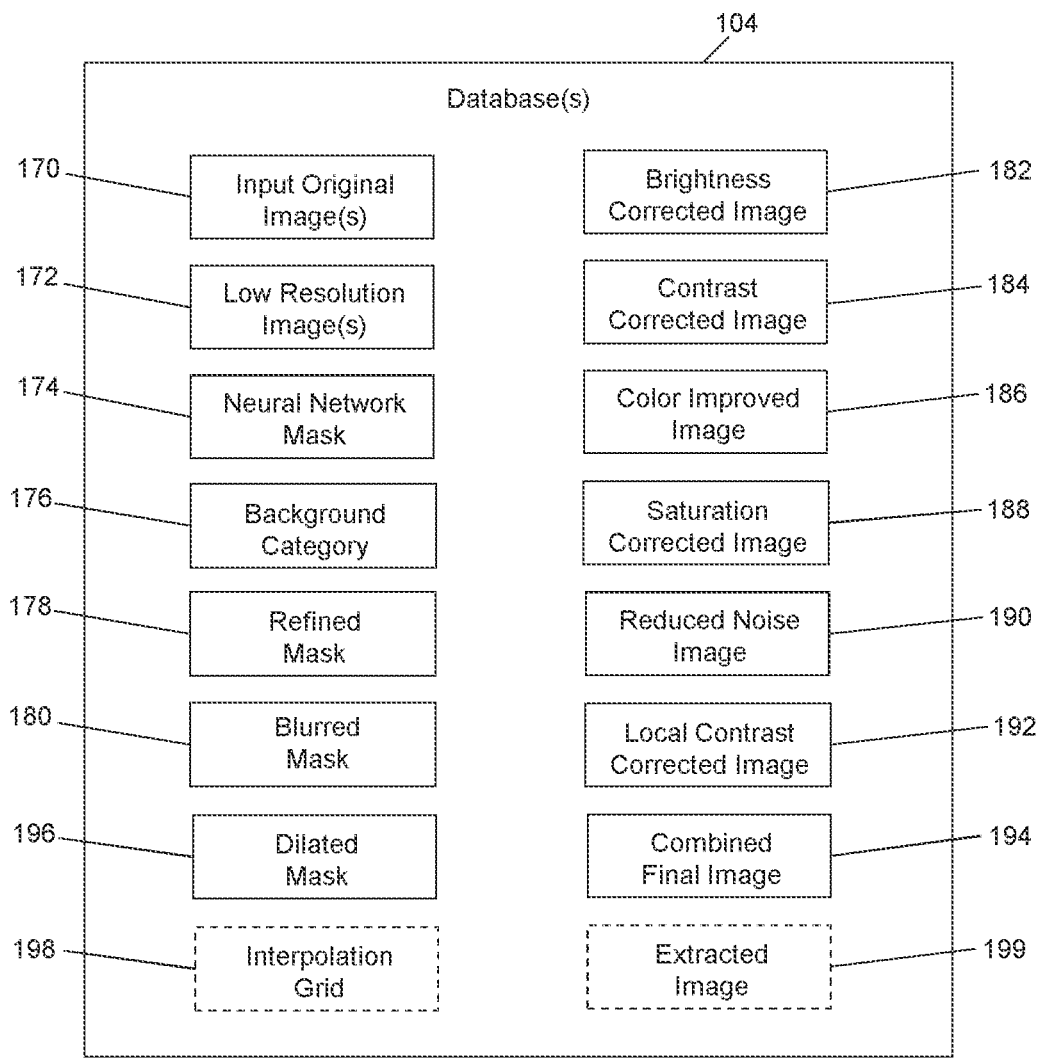
FIG. 3 is a block diagram of an exemplary database of a system for selective enhancement of objects in images in accordance with the present disclosure.

FIG. 3 is a block diagram illustrating the database 104 of the system 100 in greater detail. The database 104 can electronically receive and/or store data corresponding to, e.g., input original images 170, low resolution images 172, neural network masks 174, background categories 176, refined masks 178, dilated masks 196, blurred masks 180, brightness corrected images 182, contrast corrected images 184, color improved images 186, saturation corrected images 188, reduced noise images 190, and local contrast corrected images 192. In some embodiments, the database 104 can receive and/or store data corresponding to, e.g., interpolation grids 198, and extracted images 199. The data electronically received and/or stored in the database 104 will be discussed in detail below with reference to sample images and the modules 106 of FIG. 2.

Figure 4:
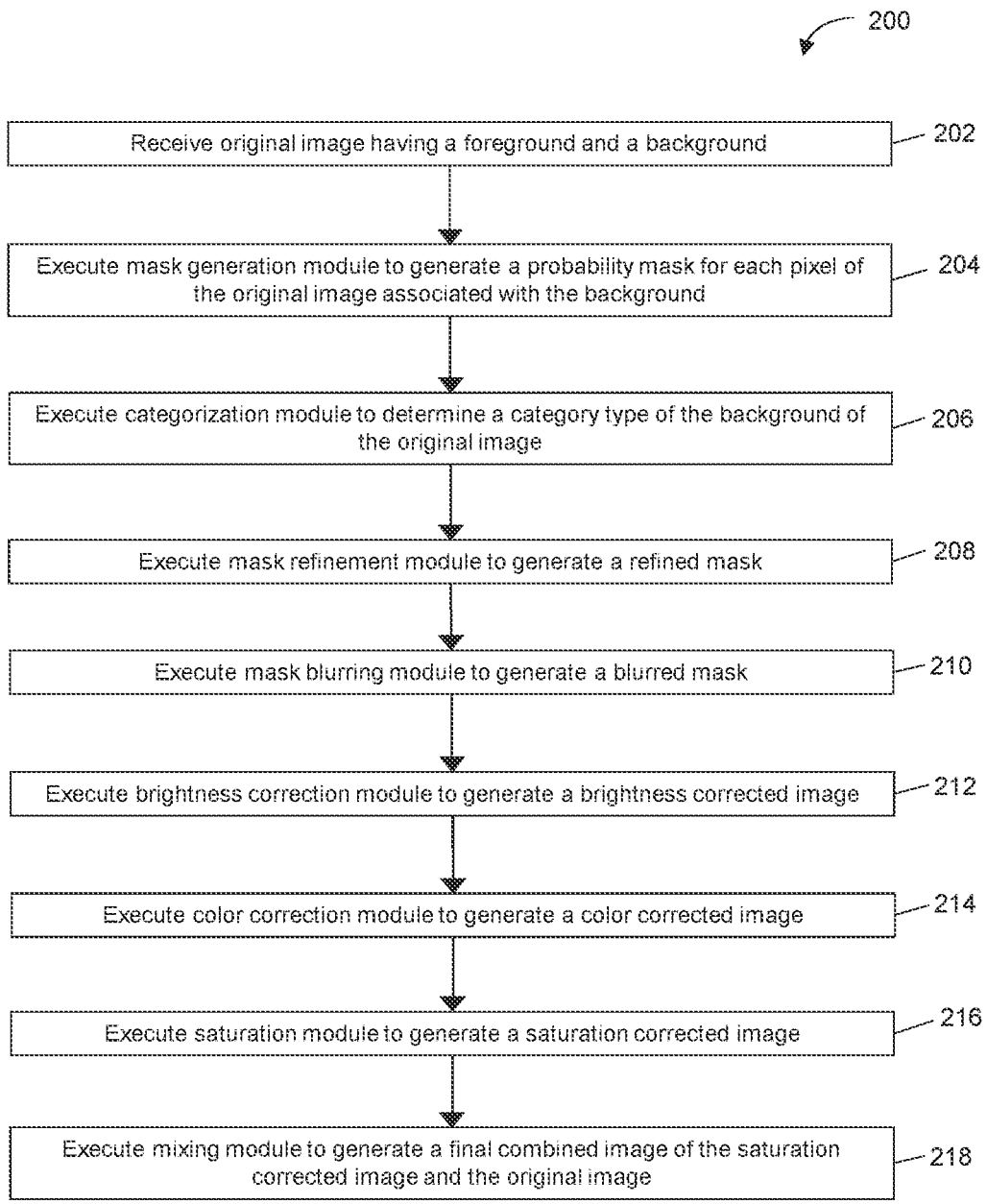
FIG. 4 is a flowchart illustrating an exemplary process of implementing a system for selective enhancement of objects in images in accordance with the present disclosure.

FIG. 4 is a flowchart 200 illustrating overall process steps executed by the system 100. To begin at step 202, an original image is received by the system, the original image having a foreground and a background each with one or more objects. At step 204, the mask generation module can be executed by the processing device to generate a probability mask for each pixel of the original image associated with the background. At step 206, the categorization module can be executed by the processing device to determine a category type of the background of the original image. At step 208, the mask refinement module can be executed by the processing device to generate a refined mask. At step 210, the mask blurring module can be executed by the processing device to generate a blurred mask.

At step 212, the brightness correction module can be executed by the processing device to generate a brightness corrected image. At step 214, the color correction module can be executed by the processing device to generate a color corrected image. At step 216, the saturation module can be executed by the processing device to generate a saturation corrected image. At step 218, the mixing module can be executed by the processing device to generate a final combined image of the saturation corrected image and the original image. In some embodiments, the process 200 can include the steps of executing the mask dilation module, the interpolation module, and the extraction module by the processing device to generate a dilated mask, an interpolation grid, and an extracted image, respectively. Details of the process 200 and additional optional steps will be discussed in greater detail below in combination with the sample images.

Figure 5:
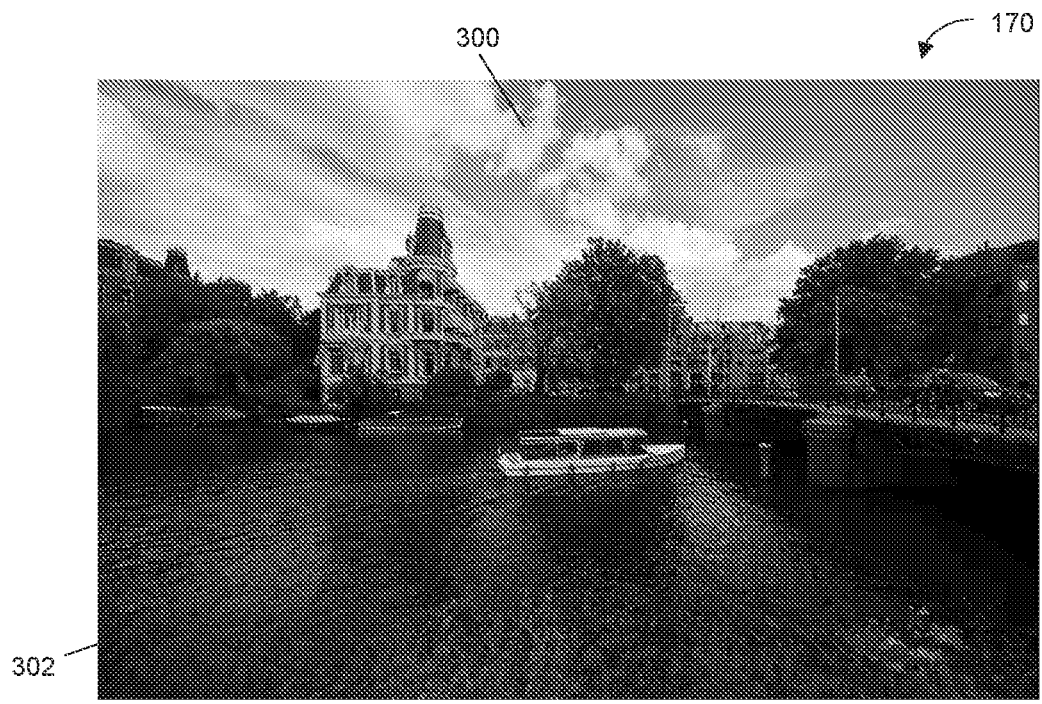
FIG. 5 is an exemplary input original image in accordance with the present disclosure.

With reference to FIG. 5, an exemplary input original image 170 is provided. The image 170 can be received as input by the system 100 and electronically stored in the database 104. Each input original image 170 includes a background 300 and a foreground 302, each with one or more identifiable or segmentable objects. For example, the background 300 in FIG. 5 can include the sky and clouds, and the foreground 302 can include the buildings, trees, water, boat, people, or the like. In some embodiments, the system 100 can generate a low resolution image 172 of the input original image 170 for further processing to optimize or improve the operational speed of the system 100 in enhancing one or more objects in the input original image 170. The low resolution image 172 can be electronically stored in the database 104. Although operation of the system 100 is discussed with respect to the input original image 170, in some embodiments, the system 100 can perform the steps discussed herein with the low resolution image 172.

Figure 6:
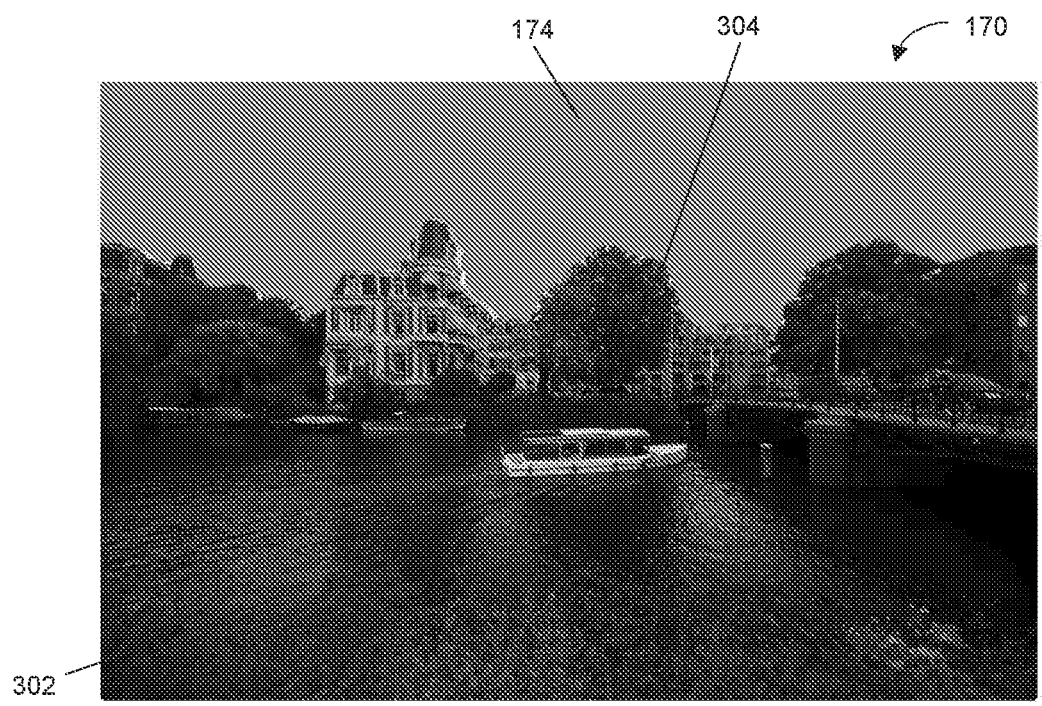
FIG. 6 is an exemplary image including a neural network mask in accordance with the present disclosure.

With reference to FIG. 6, the mask generation module 130 can receive as input the original image 170, and is executed by the processing device 108 to generate a neural network mask 174 to be electronically stored in the database 104. The mask generation module 130 can operate in combination with the neural network 118 to recognize and segment specific objects or portions of the image 170. For example, the object segmentation network 120 of the neural network 118 can be trained to detect, define and segment the sky as the background 300 of the image 170. The mask generation module 130 and the neural network 118 thereby receive as input the image 170 and generate a probability object mask (e.g., neural network mask 174) for each pixel of the image 170 in which the sky is detected. As an example, a probability value can be used for determining the probability of the pixel being associated with the background 300.

In some embodiments, the probability value can be between 1 (e.g., 100%) and 0 (e.g., 0%), with 100% indicating to the neural network 118 that the pixel is associated with the background 300 (e.g., the sky) and 0% indicating to the neural network 118 that the pixel is not associated with the background 300 (e.g., the sky). In some embodiments, if the probability value is at or above a threshold probability value (e.g., 70%), the neural network 118 can identify the pixel as being associated with the background 300. In such embodiments, if the probability value is below the threshold probability value (e.g., below 70%), the neural network 118 can identify the pixel as not being associated with the background 300. In some embodiments, the threshold probability value can be, e.g., 60%, 65%, 70%, 75%, 80%, 85%, 90%, 95%, 100%, or the like. For clarity, FIG. 5 illustrates the neural network mask 174 in red. In some embodiments, the neural network mask 174 may not be sufficiently accurate due to potential overlap at the border or edge 304 between the neural network mask 174 and the foreground 302 between the neural network mask 174 and edges of buildings, trees, small and thin objects, or the like. As such, refinement of the neural network mask 174 can be performed.

If the mask generation module 130 provides a neural network mask 174 that is empty or has a value of 0, the mask generation module 130 can determine that a sky is not included or defined in the image 170. In such instances, the system 100 can cease operation of analyzing and enhancing the image 170 if the focus of the system 100 is on enhancing the sky as the intended object. In some embodiments, the categorization module 132 can receive as input the image 170 and the neural network mask 174, and can be executed by the processing device 108 to determine the background category 176 associated with the object segmented and defined by the neural network mask 174. The background categories 176 can include, e.g., blue day sky (with and without clouds), sunset, dawn, cloudy sky, stormy sky with pronounced clouds, night sky, fog or haze, or the like. Determining the background category 176 can assist in the enhancement process. For example, if the categorization module 132 determines that the segmented sky in the image 170 is a foggy or hazy sky (e.g., substantially gray), the system 100 can cease the enhancement process because such uniform coloration of the sky cannot be improved or changed.

In some embodiments, the neural network mask 174 can be refined by the system 100 prior to subsequent steps. For example, with reference to FIG. 7, the mask refinement module 134 can receive as input the image 170 with the neural network mask 174, and is executed by the processing device 108 to generate a refined mask 178 to be electronically stored in the database 104. In some embodiments, the neural network mask 174 can be refined using probabilistic color models. As a color model, a three-dimensional histogram can be used where the coordinates of the cells (e.g., bins) are the color values of the red-green-blue (RGB) pixels. Equations 1-5 below can be used for the probabilistic color models:

$$\text{float skyHist}[N][N][N] \qquad (1)$$

$$\text{float nonSkyHist}[N][N][N] \qquad (2)$$

$$\text{Int } x = \text{pixel}.r*(N-1) \qquad (3)$$

$$\text{Int } y = \text{pixel}.g*(N-1) \qquad (4)$$

$$\text{Int } z = \text{pixel}.b*(N-1) \qquad (5)$$

where N is a dimension equal to 8. Two histograms can be used to count pixels under the mask 174 of the sky (one histogram) and pixels outside the mask 174 of the sky (second histogram) (e.g., skyHist and nonSkyHist). After counting, the histograms can be normalized by dividing by the number of pixels in each histogram. The result can be a model of the probability distribution of colors. The refined mask can be generated by comparing the probability distribution of colors using Equation 6 below:

$$\text{refinedisSkyPixel} = \text{skyHist}[z][y][x] > \text{nonSkyHist}[z][y][x] \qquad (6)$$

Figure 7:
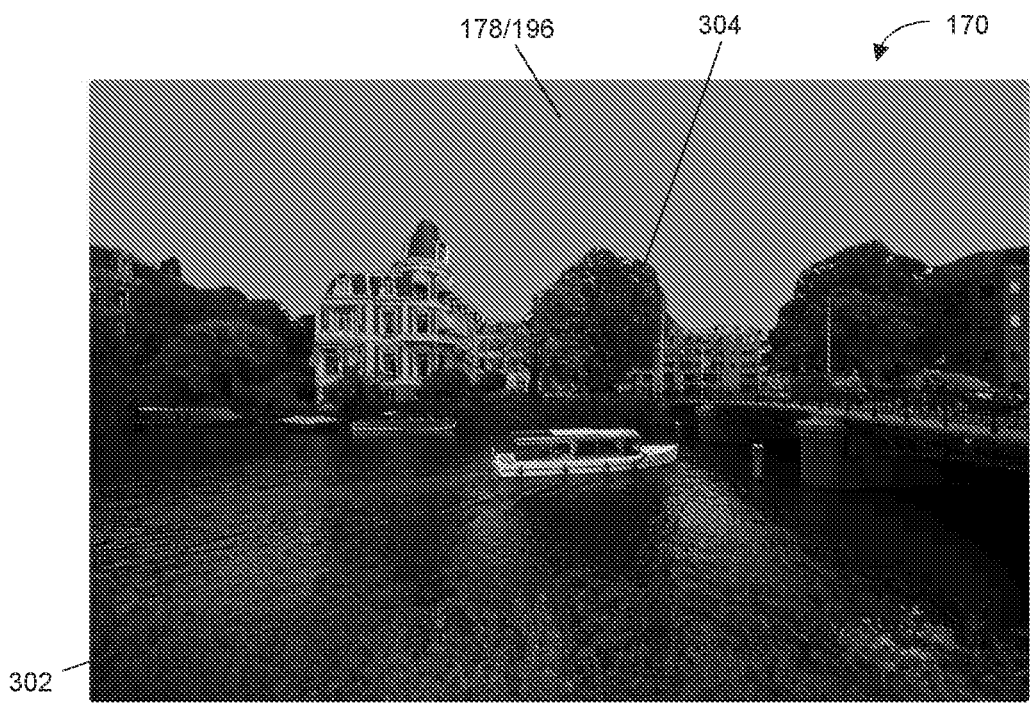
FIG. 7 is an exemplary image including a refined mask in accordance with the present disclosure.

Still with reference to FIG. 7, in some embodiments, the refinement of the neural network mask 174 can include operation of the mask dilation module 154 (e.g., mask indentation module). The mask dilation module 154 can receive as input the image 170 and the refined mask 178, and is executed by the processing device 108 to generate a dilated mask 196 (e.g., an indented mask). In particular, after constructing the neural network mask 174 and/or the refined mask 178, the mask dilation module 154 generates a dilation or indentation from the edge 304 of the border of the refined mask 178 for reliable operation of future transformations. In some embodiments, an inversion mask can be used to indent from the edges 304. The indent/dilation distance or parameter (e.g., fix gap) defines the distance for indenting from the edges 304 and can be adjusted using a manual adjustment slider in the user interface 114 and/or automatically set by the system 100. In some embodiments, the system 100 can use a predetermined or default constant value for the indent/dilation distance. The mask dilation module 196 therefore ensures that the dilated mask 196 accurately captures the sky without capturing or overlapping with undesired objects of the foreground 302. Particularly, the dilated mask 196 ensures that only the object to be enhanced is selected in the image 170 by capturing all pixels associated with the background. In some embodiments, execution of the mask dilation module 154 can expand the border or edge 304 of the neural network mask 174 to capture any missing edge pixels associated with the sky, thereby slightly expanding the neural network mask 174.

Optionally, the interpolation module 156 can be implemented in processing the image 170. The interpolation module 156 can receive as input the image 170 and the refined and/or dilated mask 178, 196, and is executed by the processing device 108 to generate an interpolation grid 198. The interpolation grid 198 (e.g., a polygonal grid) can be constructed to interpolation or extrapolate the background (e.g., sky) using mean value coordinates interpolation. The interpolation grid 198 can be generated by subtracting the dilated mask 196 from the image 170 to obtain a polygonal grid that identifies the remainder or foreground 302 of the image 170. The generated interpolation grid 198 can be used by the system 100 to extract or erase the foreground 302 geometry from the background 300 to build and enhance a potentially endless background 300 (e.g., sky) behind the extracted foreground 302.

Optionally, the extraction module 158 can be implemented in processing the image 170. The extraction module 158 can receive as input the image 170 and the interpolation grid 198, and is executed by the processing device 108 to extract the foreground 302 represented by the interpolation grid 198 from the image 170. The result of such extraction is the extracted image 199, which includes only the background 300. Extraction of only the background 300 based on the interpolation grid 198 can assist in separating the desired object from the image 170 for subsequent enhancement prior to combining the enhanced object with the foreground 302. The colors of the sky or background 300 under the objects represented by the interpolation grid 198 (e.g., objects previously covered by the foreground 302) can be estimated by the system 100 to represent colors of a potential sky under the extracted geometry. The extracted image 199 thereby only includes the background 300 of the image 170.

Figure 8:
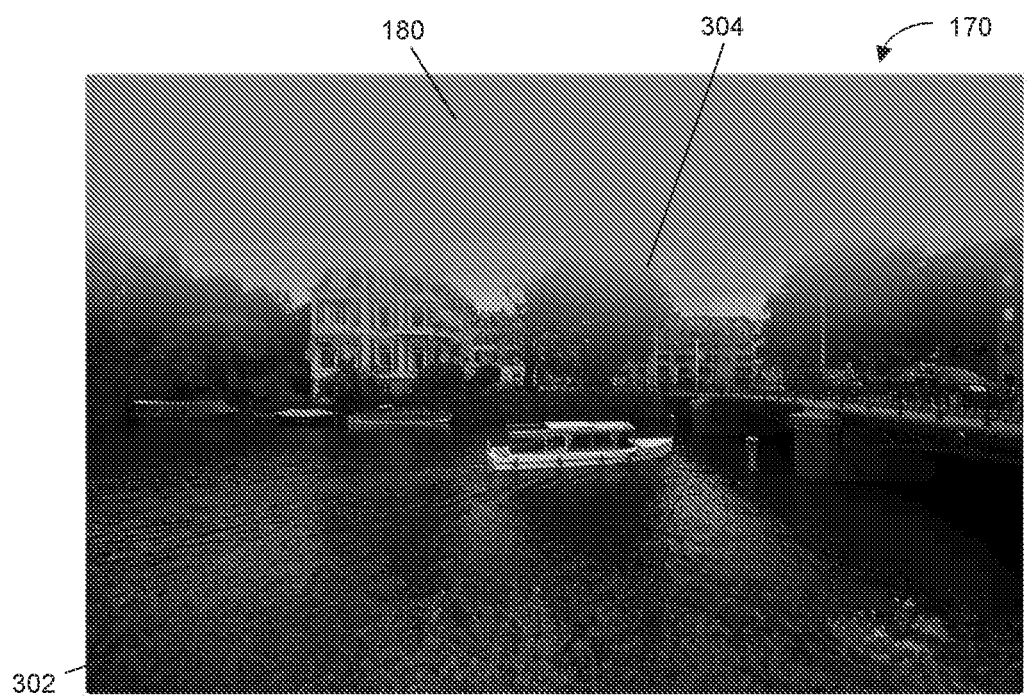
FIG. 8 is an exemplary image including a blurred mask in accordance with the present disclosure.

With reference to FIG. 8, the mask blurring module 136 can receive as input the neural network mask 174 (and/or the refined mask 178 or the dilated mask 196) and the image 170, and is executed by the processing device 108 to generate a blurred mask 180. The mask blurring module 136 generates a blur along the border or edge 304 to hide mask inaccuracies and achieve a smooth transition at the edge 304 between the foreground 302 and the background 300. The potential overlap in pixels between the blurred mask 180 and the foreground 302 does not hurt the final enhanced effect of the image 170. Instead, such potential overlap due to the blurring can be addressed by excluding the respective pixels from further processing at subsequent steps discussed below.

In some embodiments, rather than using the blurred mask 180, the refined mask 178 and/or the dilated mask 196 can be used to obtain a higher accuracy of the mask for further enhancement.

Figure 9:
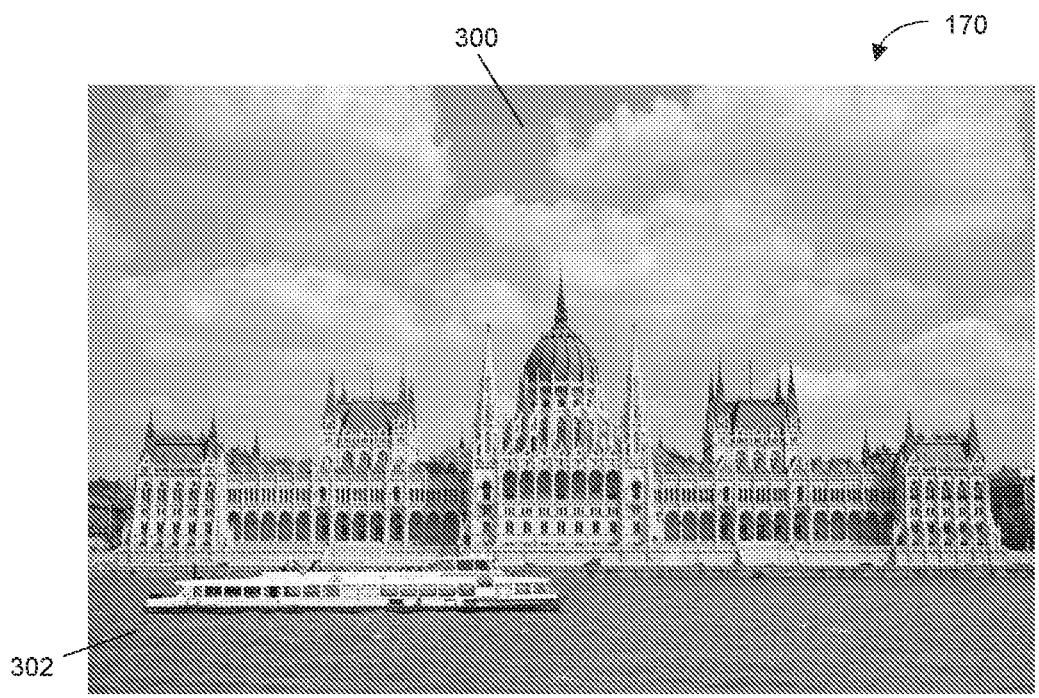
FIG. 9 is an exemplary input original image in accordance with the present disclosure.
Figure 10:
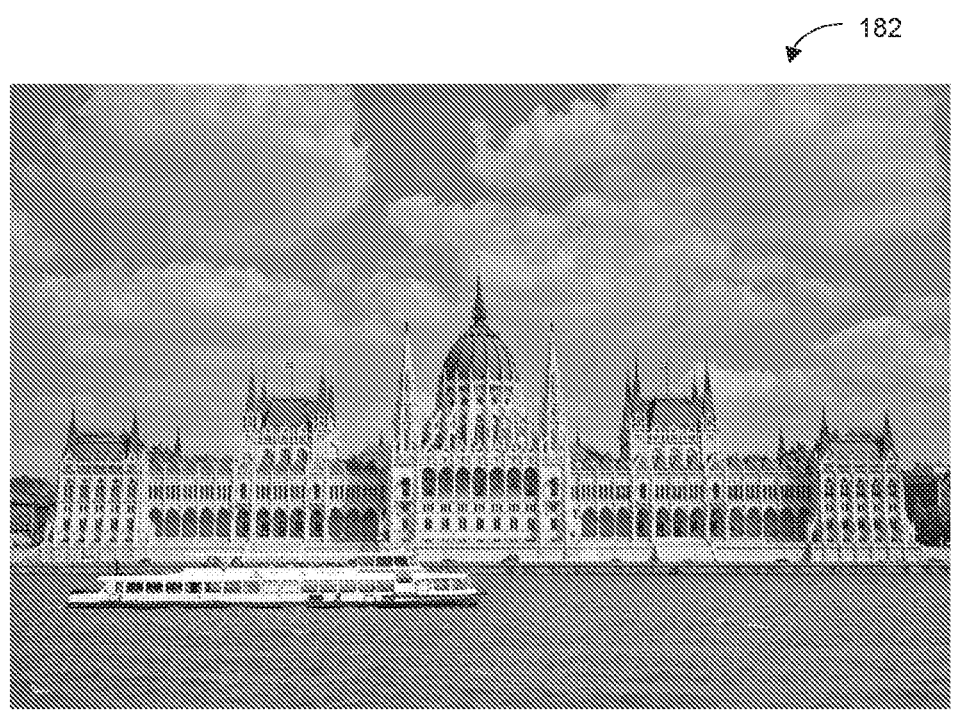
FIG. 10 is an exemplary brightness corrected image in accordance with the present disclosure.

To improve the sky in the image 170, one or more enhancements to the sky defined by the blurred mask 180 can be applied. With reference to FIGS. 9-10, optionally, the brightness correction module 138 can receive as input the blurred mask 180 and the image 170, and is executed by the processing device 108 to generate a brightness corrected image 182. FIG. 9 shows the image 170, and FIG. 10 shows the brightness corrected image 182. The brightness correction module 138 can be applied to any non-night sky due to the dimness or darkness of the night sky. Generally, the sky in the image 170 may include excess brightness. The brightness of the pixels associated with the sky is lowered by the system 100 using a highlights lowering algorithm. The algorithm as performed by the brightness correction module 138 lowers the brightness of the brightest pixels associated with the sky and simultaneously does not allow changes in brightness of pixels from the middle and low brightness range (e.g., decreasing highlights to normalize the image).

The brightness correction performed by the module 138 can be applied as a gradient to brighten pixels that are at a dark end of a brightness range, and darken pixels that are at a bright end of the brightness range, with application of the gradient stopping at the mid-tone area of the brightness range. For example, if value 1 is considered the brightest pixel and value 0 is considered black (or the darkest pixel), the mid-tones can be at about 0.5. For the brightest pixels, the gradient can be applied to bring the brightness within the range 0.5-1 closer to the 0.5 value, and for the darkest pixels, the gradient can be applied to bring the brightness within the range 0-0.5 closer to the 0.5 value. In some embodiments, a slider (e.g., user control) and/or automatic adjustment by the system 100 can be used to adjust the brightness correction applied to the image 170. For example, the slider for brightness correction in the user interface 114 can be positioned at a value of 80%. In some embodiments, the brightness of the highlights in the image 170 can be lowered by the system 100 from about 15% to about 40% to achieve preferable correction results. The brightest zones in the image 170 are thereby restored and bring the sky in harmony with the remainder of the frame. If the brightness correction module 138 determines that there are no bright pixels in the sky, the highlights lowering algorithm does not take any action and leaves the sky as it is.

The steps taken by the brightness correction module 138 can be adaptive and can work differently on each image 170. Adaptive brightness can be used to bring down exposure of the bright sky. For example, if the sky is dark in nature, the result can be adjusted only a small amount. As a further example, if the sky is brighter in nature, the result can be adjusted a greater amount to enhance the brightness in the image 170. The brightness correction module 138 therefore normalizes brightness of the sky and recovers overblown highlights in brightness.

Figure 11:
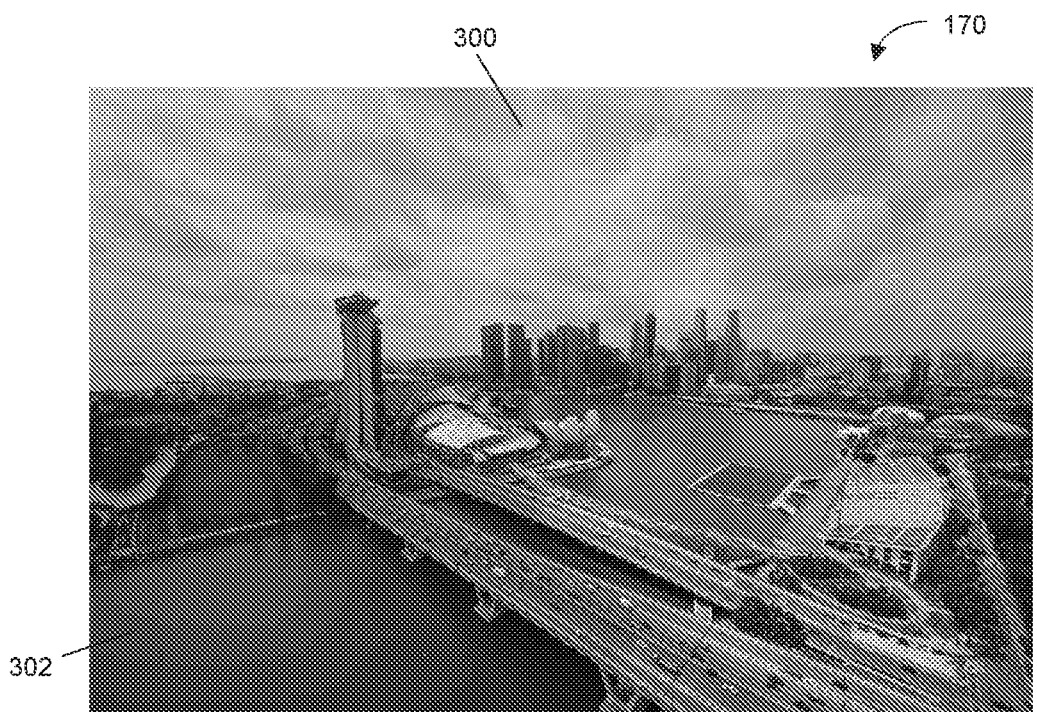
FIG. 11 is an exemplary input original image in accordance with the present disclosure.
Figure 12:
FIG. 12 is an exemplary contrast corrected image in accordance with the present disclosure.

With reference to FIGS. 11-12, optionally, the contrast correction module 140 can receive as input the blurred mask 180 and the image 170, and is executed by the processing device 108 to generate a contrast corrected image 184. FIG. 11 shows the image 170, and FIG. 12 shows the contrast corrected image 184. The contrast correction module 140 can be applied to any non-night sky due to the dimness or darkness of the night sky. The contrast correction module 140 generally increases the contrast level of one or more pixels associated with the sky. The contrast of the sky is increased such that the bright clouds become more contrasted with the remainder of the sky. In addition, the contrast that could potentially be lost or diminished by adjusting the brightness of the sky with the brightness correction module 138 is restored with the contrast correction module 140. To increase the contrast, various algorithms can be applied by the contrast correction module 140 (e.g., simple contrast algorithm, smart local algorithm, or the like).

Figure 13:
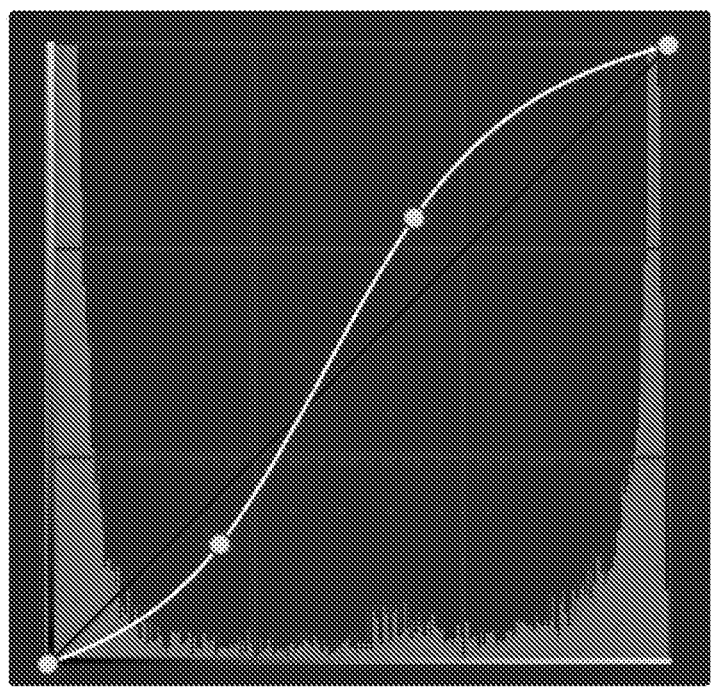
FIG. 13 is an exemplary S-curve for contrast enhancement in accordance with the present disclosure.

In some embodiments, the contrast correction module 140 can apply a gradient curve to the image 170 to adjust or correct the contrast in the image 170. The gradient curve correction can provide a smooth adjustment of the contrast within the image 170. As an example, an increase in contrast can be performed by application of an S-curve (see, e.g., FIG. 13). In some embodiments, the contrast can be enhanced with an overall strength (e.g., transparency), e.g., within a range of about 25% to about 50%, within a range of about 30% to about 45%, within a range of about 35% to about 45%, about 40%, or the like. The strength of the increase in contrast can be separately adjusted by a specific slider in the user interface 114. The strength level or amount can be defined by the magnitude of the S-curve slope.

Figure 14:
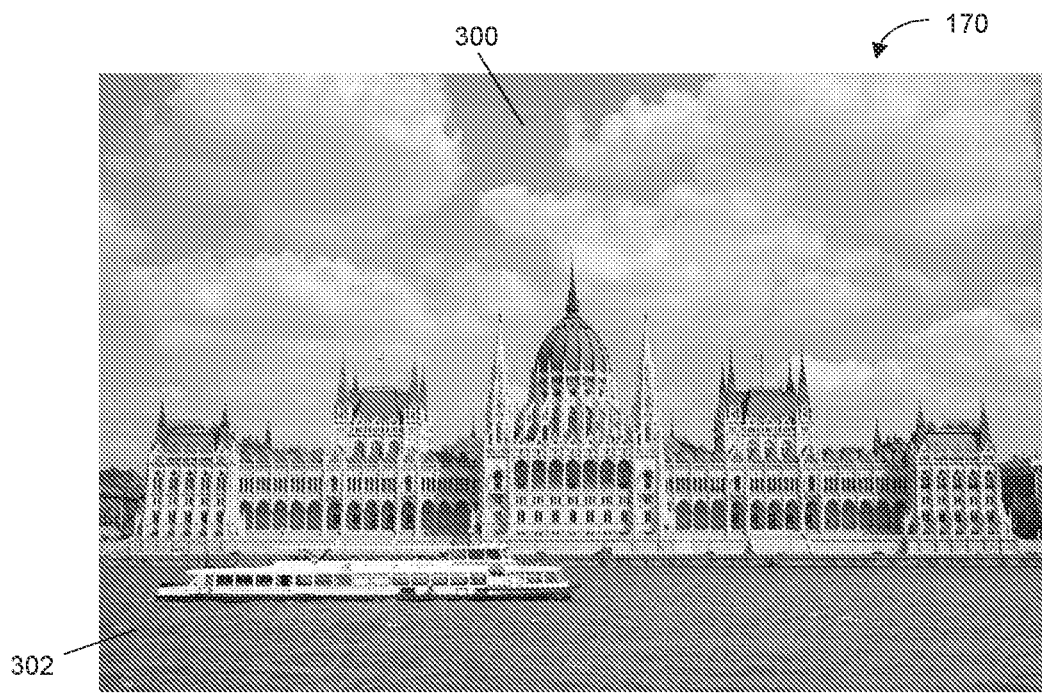
FIG. 14 is an exemplary input original image in accordance with the present disclosure.
Figure 15:
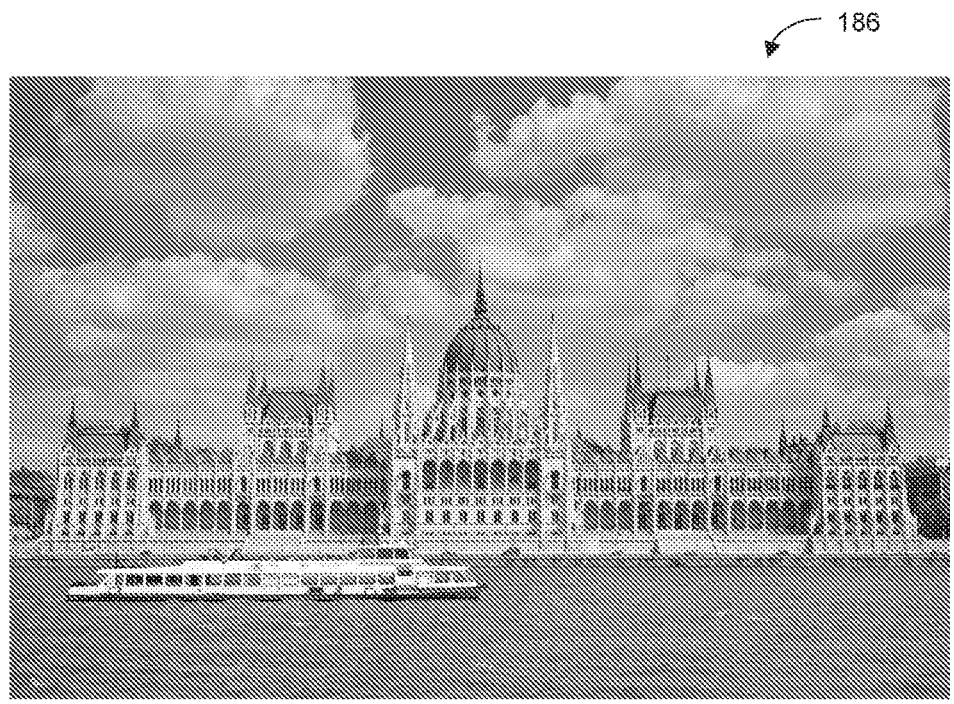
FIG. 15 is an exemplary color improved image in accordance with the present disclosure.

With reference to FIGS. 14-15, the color improvement module 142 can receive as input the blurred mask 180 and the image 170, and is executed by the processing device 108 to generate a color improved image 186. FIG. 14 is the image 170, and FIG. 15 is the color improved image 186. The color improvement module 142 can improve the colors of the blue sky and creates the effect of a deep blue sky. The color improvement module 142 can lower the brightness of the pixels associated with the sky in the blue channel to give the sky a greater depth of blue. Although the change can be applied by the module 142 for every type of sky, the enhancement by the module 142 generally has a greater effect in daytime blue skies.

As an example, improved blueness of the sky can be applied with a strength (e.g., transparency), e.g., within a range of about 30% to about 70%, within a range of about 40% to about 70%, within a range of about 50% to about 70%, of about 60%, or the like. The effect can be applied across all pixels associated with the sky. In some embodiments, the process performed by the color improvement module 142 can include the steps of gamma correction (e.g., power 2.4) and normalization, conversion to hue-saturation-value (HSV) and, if the color is green (e.g., hue satisfies hardcoded green thresholds), a curve is applied to saturation and value. The value coefficient for saturation and value can be calculated as a curve by Equation 7:

$$1.0f-\exp(-8.0f*\text{value})/(1.0f-\exp(-8.0f)) \quad (7)$$

Saturation can be blended with a power curve of saturation as represented by Equation 8:

$$(1.0f-\exp(\text{saturation}*(-32.0f))/(1.0f-\exp(-32.0f)) \quad (8)$$

with opacity, and proportional to the value coefficient and power curve of saturation with exponent 0.2 value is blended with power curve of value represented by Equation 9:

$$(1.0f-\exp(\text{value}*(32.0f))/(1.0f-\exp(32.0f)) \quad (9)$$

with opacity, proportional to the value coefficient and power curve of saturation with exponent 0.25. In such instances, the hue is not changed and the image is converted back to red-green-blue (RGB). The inverse gamma correction (e.g., power −2.4) can be used and returned to initial range (inverse normalization). Such color correction can be sequentially performed by the system 100 using the steps of Equations 7-9. For a pixel wise effect, gammaCorrection (power 2.4) and normalization is first performed. Next, conversion to HSV is performed. If the color of the pixel is green (e.g., hue satisfies hardcoded green thresholds), the curve is applied to the saturation and value. The value coefficient (calculated as a curve using Equation 7) is common for saturation and value. Saturation is then blended with the power curve of saturation as represented by Equation 8 with opacity proportional to the value_coefficient, and the power curve of saturation with an exponent of 0.2. The value is next blended with the power curve of a value represented by Equation 9 with opacity proportional to the value_coefficient and power curve of saturation with an exponent of 0.25. The hue remains unchanged. The pixels are converted back to RGB, and the inverse gammaCorrection (power −2.4) is used to return to the initial range (e.g., inverse normalization).

Figure 16:
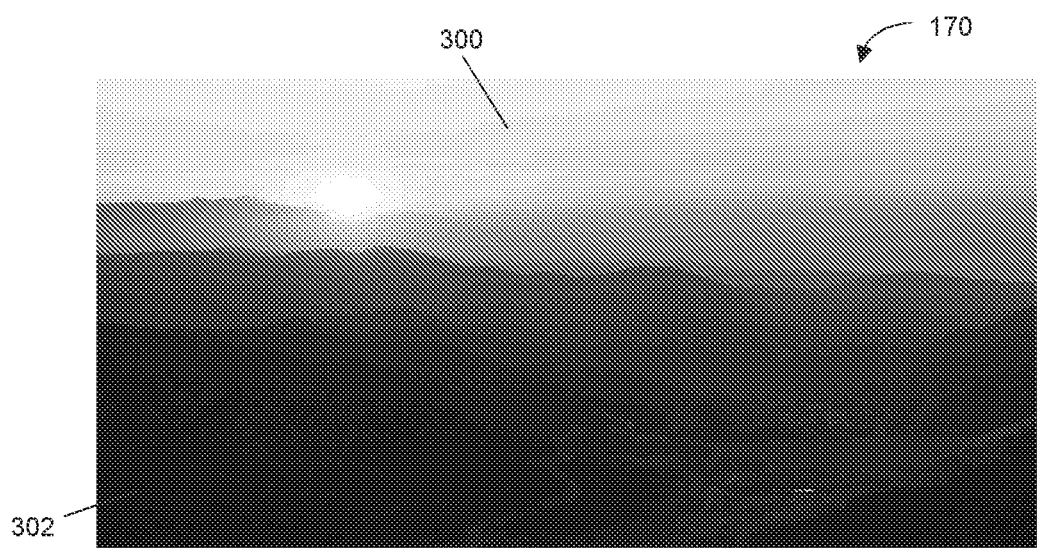
FIG. 16 is an exemplary input original image in accordance with the present disclosure.
Figure 17:
FIG. 17 is an exemplary saturation corrected image in accordance with the present disclosure.

With reference to FIGS. 16-17, optionally, the saturation module 144 can receive as input the blurred mask 180 and the image 170, and is executed by the processing device 108 to generate a saturation corrected image 188. FIG. 16 is the image 170, and FIG. 17 is the saturation corrected image 188. The saturation module 144 can be applied to any non-night sky due to the dimness or darkness of the night sky. The saturation module 144 can increase the saturation in the yellow channel for pixels associated with the sky. The saturation for yellow is increased with tint in the sky for sunset lighting. Yellow is generally present in sunset lighting and is absent in the daytime sky. The increase in yellow saturation can be performed to enhance the effect of sunset lighting. Although the change can be applied by the module 144 for every type of sky, the enhancement by the module 144 generally has a greater effect in sunset skies.

As an example, the gain in yellow saturation can be applied with a strength (e.g., transparency), e.g., within a range of about 20% to about 50%, within a range of about 30% to about 50%, within a range of about 35% to about 45%, of about 40%, or the like. The colors that have a yellow tint increase saturation to more prominently express yellow colors. Hue-saturation-lightness (HSL) for yellow saturation parameter can be an E-curve for each pixel. In some embodiments, the yellow saturation in the image 170 can be improved by creating a spline curve for the saturation. For each pixel in the image 170, the HSL can be converted to hue-saturation-value (HSV), the curve can be applied to the saturation channel, and the value can be converted to RGB.

Figure 18:
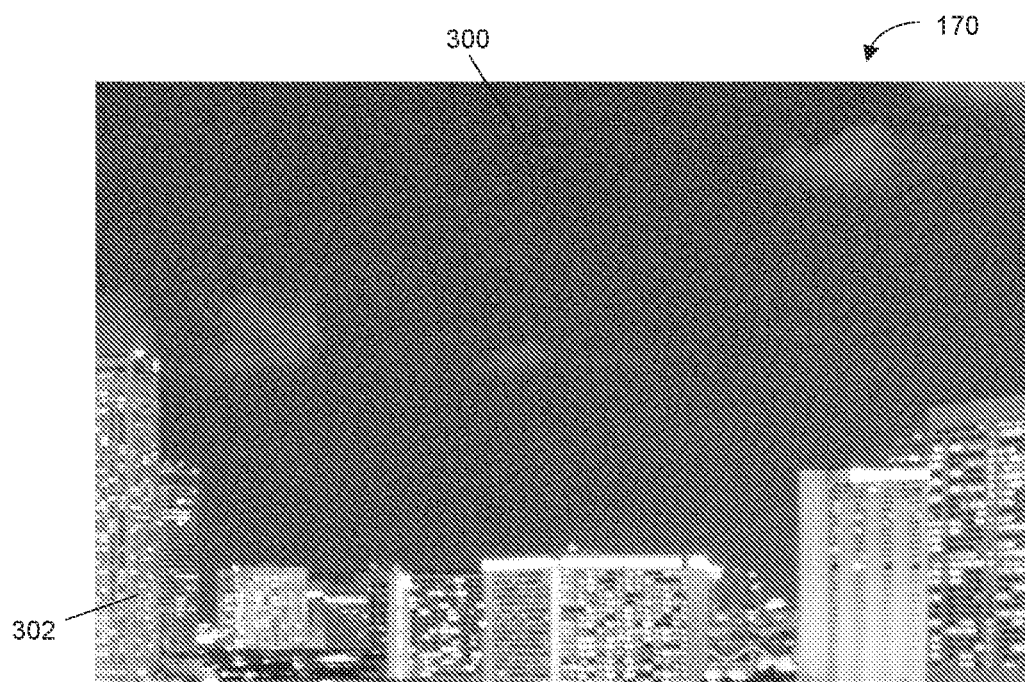
FIG. 18 is an exemplary input original image in accordance with the present disclosure.
Figure 19:
FIG. 19 is an exemplary reduced noise image in accordance with the present disclosure.

With reference to FIGS. 18-19, optionally, the noise reduction module 146 can receive as input the blurred mask 180 and the image 170, and is executed by the processing device 108 to generate a reduced noise image 190. FIG. 18 is the image 170, and FIG. 19 is the reduced noise image 190. Both images 170, 190 are zoomed in at 200% to better visualize the noise reduction effect. The noise reduction module 146 can be applied to any night sky. Particularly, for a night sky, the noise can be reduced with special noise reduction algorithms. Generally, the noise in a nighttime image can be most pronounced in the sky. The neural network mask 174 and the blurred mask 180 can be used to localize and segment the night sky from the image 170, and specifically enhance the night sky with a greater or more aggressive noise reduction than typically used. The greater noise reduction can be performed due to the localized application of such enhancement. Specifically, because the system 100 is able to segment the sky from the foreground of the image 170, the noise reduction module 146 can adjust the strength or effect of noise correction to the sky without affecting the foreground 170. In some embodiments, the noise reduction algorithms that can be applied by the noise reduction module 146 can be, e.g., block matching and 3D filtering, shrinkage fields (image restoration), or any other de-noising techniques.

Figure 20:
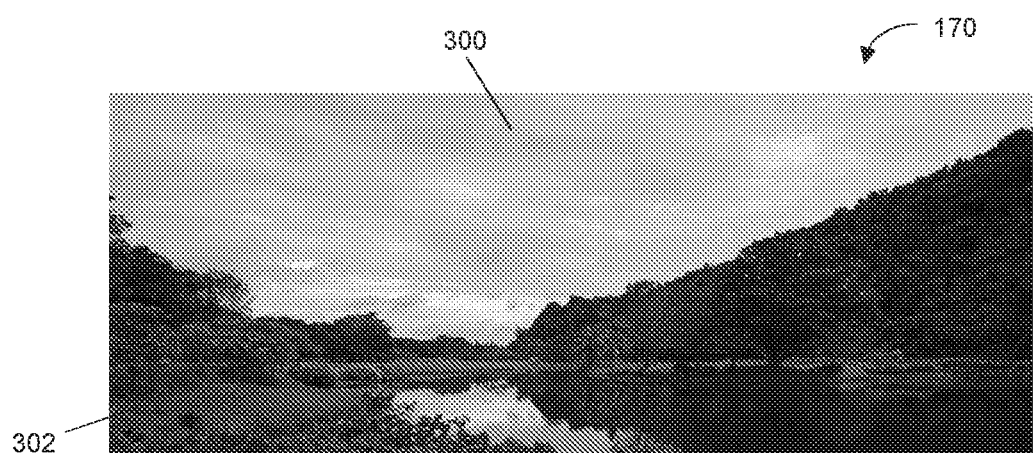
FIG. 20 is an exemplary input original image in accordance with the present disclosure.
Figure 21:
FIG. 21 is an exemplary local contrast corrected image in accordance with the present disclosure.

With reference to FIGS. 20-21, optionally, the local contrast module 148 can receive as input the blurred mask 180 and the image 170, and is executed by the processing device 108 to generate a local contrast corrected image 192. FIG. 20 is the image 170 with a grey sky, and FIG. 21 is the local contrast corrected image 192 including local structure enhancements to significantly enhance the grey sky. The local contrast module 148 can be applied to an image with a cloudy sky to increase the local contrast and structure of the clouds. In some embodiments, a mid-tone contrast magnification technique can be used to improve detail in the cloudy sky and increase cloud visibility. Any local contrast improvement technique can be used by the local contrast module 148, e.g., ordinary curve, histogram equalization algorithms (hit eq), clarity, combinations thereof, or the like. Therefore, the system 100 can use any algorithm to extract details to modify the sky to be more detailed and dramatic. The details of the sky in FIG. 20 were significantly improved with the local contrast adjustments applied by the local contrast module 148 (see, e.g., FIG. 21).

Figure 22:
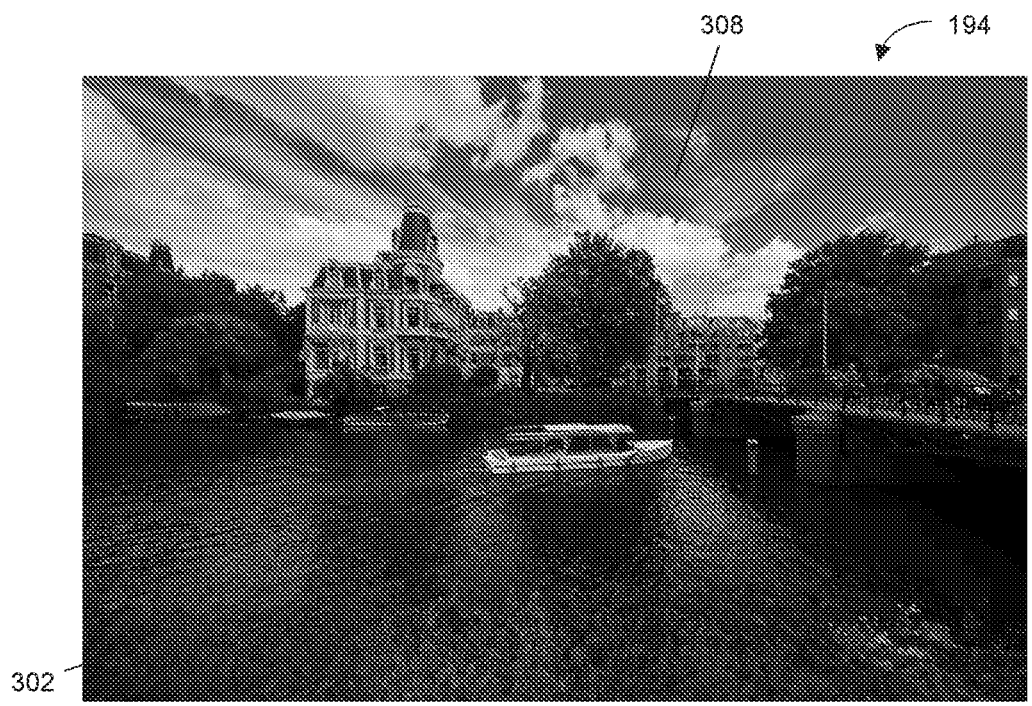
FIG. 22 is an exemplary combined image in accordance with the present disclosure.

With reference to FIG. 22, the mixing module 150 can receive as input the blurred mask 180 and the image 170 with any enhancements performed on the image 170, and is executed by the processing device 108 to generate a combined image 194 (e.g., a combined final output image). The combined image 194 includes a combination of the original foreground 302 and an enhanced background 308. During mixing of the foreground 302 with the enhanced background 308, transparency can be controlled by the amount parameter that the user/operator and/or system 100 sets. The transparency amount parameter can be dependent on, e.g., the effect strength corresponding with the strength of the effect that is configured by the user and/or system 100, and the artificial intelligence (AI) mask opacity corresponding with the transparency of the AI mask at a given point. The transparency value can control the overall strength of the effect(s) applied to the image 170. The transparency value reflects on the opacity between the original, non-adjusted sky and the new, adjusted sky. The transparency value can be in a range of between 0% (e.g., no adjustments applied) to 100% (e.g., full adjustment strength applied). In some embodiments, the mixing or blending performed by the mixing module 150 can be represented by Equation 10:

$$\text{Result} = \text{Sky Enhanced Image} * \text{Amount} + (1 - \text{Amount}) * \text{Original Image} \quad (10)$$

where Result is the combined image 194, Sky Enhanced Image is the image 170 with any enhancements performed in the form of the enhanced background 308, Amount is the transparency parameter value, and Original Image is the original image 170.

Figure 23:
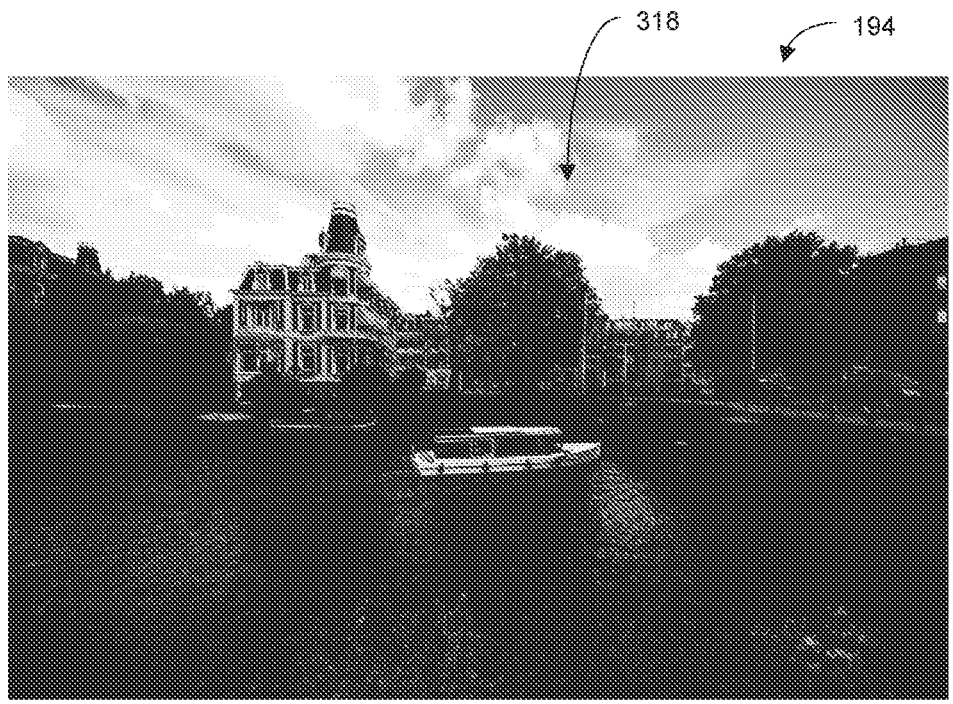
FIG. 23 is an exemplary combined image including a luminosity mask in accordance with the present disclosure.

With reference to FIG. 23, in some embodiments, the luminosity mask module 152 can be executed in combination with the mixing module 150 to produce the combined image 194 with a luminosity mask 318. The luminosity mask module 152 can receive as input the neural network mask 174 of the image 170 and does not modify pixels that are darker than a predetermined threshold value to exclude image pixels that are contained within the neural network mask 174 but are actually not part of the sky in the image 170. The predetermined threshold value can be a value between 1 and 0. In such embodiments, 1 can represent the brightest pixels and 0 can represent the darkest pixels. In some embodiments, the predetermined threshold value can be in a range of between, e.g., about 0.1 to about 0.8, about 0.2 to about 0.7, about 0.3 to about 0.6, about 0.4 to about 0.5, or the like. Specifically, the luminosity mask module 152 can clarify to the system 100 that the enhancements made to the background 300 captured in the neural network mask 174 should only be applied to pixels associated with the sky based on the predetermined threshold value. Such determination and application can be made because pixels associated with the sky are generally the brightest in the image 170, with the luminosity value of the pixels being used as a determining factor for application of the enhancements. The grayscale image defined by the luminosity mask 318 allows for a determination of the brightness value for each of the pixels. As can be seen from FIG. 23, the majority of the brightest pixels are associated with the sky and can thereby be identified as having a high probability of being associated with the sky by the system 100.

In some embodiments, the process associated with the luminosity mask module 152 can include setting a predetermined threshold value into the system 100 to define the separation between the full use of the enhancements and a weakened effect. Thus, in some embodiments, the luminosity mask module 152 can apply enhancements to pixels that are equal to and above the predetermined threshold value and does not apply enhancements to pixels below the predetermined threshold value. In other embodiments, the luminosity mask module 152 can apply the full effect of the enhancements to pixels that are equal to and above the predetermined threshold value and apply a weakened effect of the enhancements to pixels below the predetermined threshold value. The predetermined threshold value can be a value between 1 and 0. In such embodiments, 1 can represent the brightest pixels and 0 can represent the darkest pixels. In some embodiments, the predetermined threshold value can be in a range of between, e.g., about 0.1 to about 0.8, about 0.2 to about 0.7, about 0.3 to about 0.6, about 0.4 to about 0.5, or the like. If the luminosity mask module 152 applies the full effect of the enhancements to the entire neural network mask 174, such application indicates that only pixels associated with the sky were included in the neural network mask 174.

The luminosity mask module 152 can calculate the pixel brightness of the image 170 for each pixel in the image 170 (before and/or after enhancement). If the pixel is brighter than a predetermined threshold value, the full enhancement effect can be applied to the pixels. If the pixels are darker than the predetermined threshold value, the luminosity mask module 152 determines the position of the pixel in the range of brightness represented by [threshold, 1] and bring the pixel to the range [0, 1]. The position of the pixel in the range of brightness can be used to scale the strength of the enhancement effect on the darker pixels. The new value in the range from [0, 1] can be used as the opacity to apply the effect. The luminosity determination can be represented by Equations 11 and 12, where if:

$$(\text{Original Image Luminosity} > \text{Sky Brightness Threshold}) \text{Effect Scale} = 1.0 \quad (11)$$

otherwise:

$$\text{Effect Scale} = ((\text{Original Image Luminosity} - \text{Sky Brightness Threshold}) / \text{Sky Brightness Threshold}) + 1.0 \quad (12)$$

Figure 24:
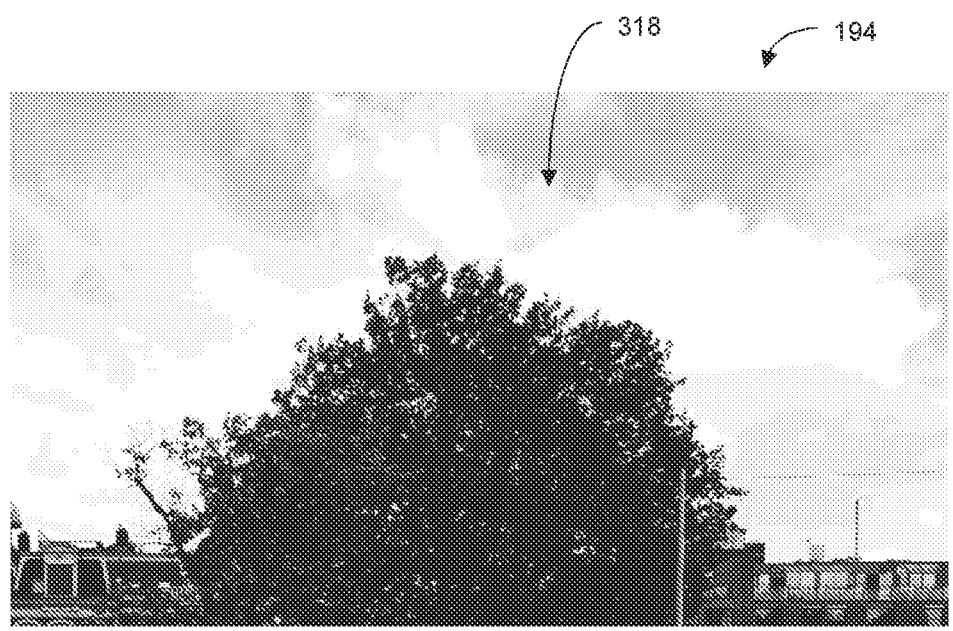
FIG. 24 is an exemplary combined image including a luminosity mask in accordance with the present disclosure.
Figure 25:
FIG. 25 is an exemplary combined image including a luminosity mask in accordance with the present disclosure.
Figure 26:
FIG. 26 is an exemplary input original image in accordance with the present disclosure.
Figure 27:
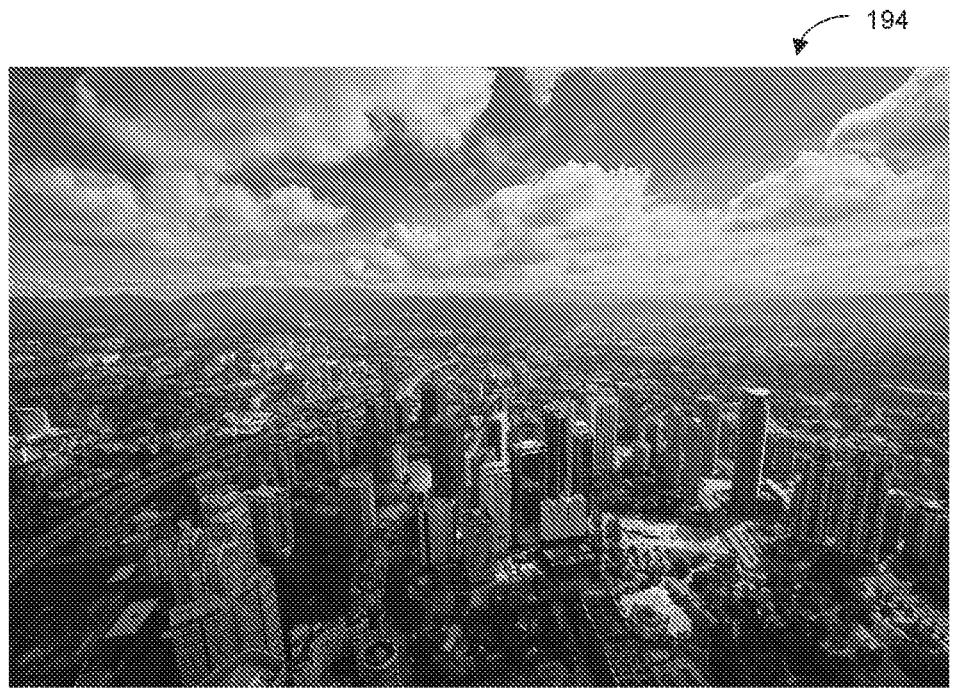
FIG. 27 is an exemplary combined image in accordance with the present disclosure.
Figure 28:
FIG. 28 is an exemplary input original image in accordance with the present disclosure.
Figure 29:
FIG. 29 is an exemplary combined image in accordance with the present disclosure.
Figure 30:
FIG. 30 is an exemplary input original image in accordance with the present disclosure.
Figure 31:
FIG. 31 is an exemplary combined image in accordance with the present disclosure.

The darker the pixel in the original image 170, the weaker the enhancement effect will be applied to that pixel. The system 100 thereby smoothly excludes the darkest pixels from applying the enhancement effect. Such exclusion of the darkest pixels allows for pixels that were inadvertently included in the neural network mask 174 to remain as in the original image 170 (e.g., without enhancements), because such pixels most likely are not part of the sky. FIGS. 24-25 provide additional examples of combined images 194 including a luminosity mask 318.

Figure 32:
FIG. 32 is an exemplary input original image in a user interface in accordance with the present disclosure.
Figure 33:
FIG. 33 is an exemplary combined image in a user interface in accordance with the present disclosure.

FIGS. 26-33 provide exemplary original images 170 and combined images 194 after enhancement by the system 100. FIGS. 32-33 are screenshots illustrating the user interface 114 (which will be discussed in greater detail below) including the images 170, 194. In each of the original images 170, the system 100 segmented the sky as the background with the neural network mask 174, and performed one or more enhancements to the sky defined by the neural network mask 174 to generate an improved and realistic combined image 194. The system 100 allows for enhancement of the sky or background independently from the foreground, ensuring that the desired effects are applied to the sky or background without affecting the foreground.

Figure 34:
FIG. 34 is a user interface including an input original image in accordance with the present disclosure.

FIG. 34 is a screenshot illustrating a user interface 114 of the system 100 in accordance with the present disclosure. The user interface 114 includes an image selection section 320 including multiple imported images for potential editing. The user interface 114 includes an image section 322 including a single image to be edited by the system 100. The user interface 114 includes an adjustment section 324 including multiple controls in the form of, e.g., sliders, check boxes, input boxes, preset adjustments, combinations thereof, or the like, for various setting controls associated with the image in the image section 322.

Figure 35:
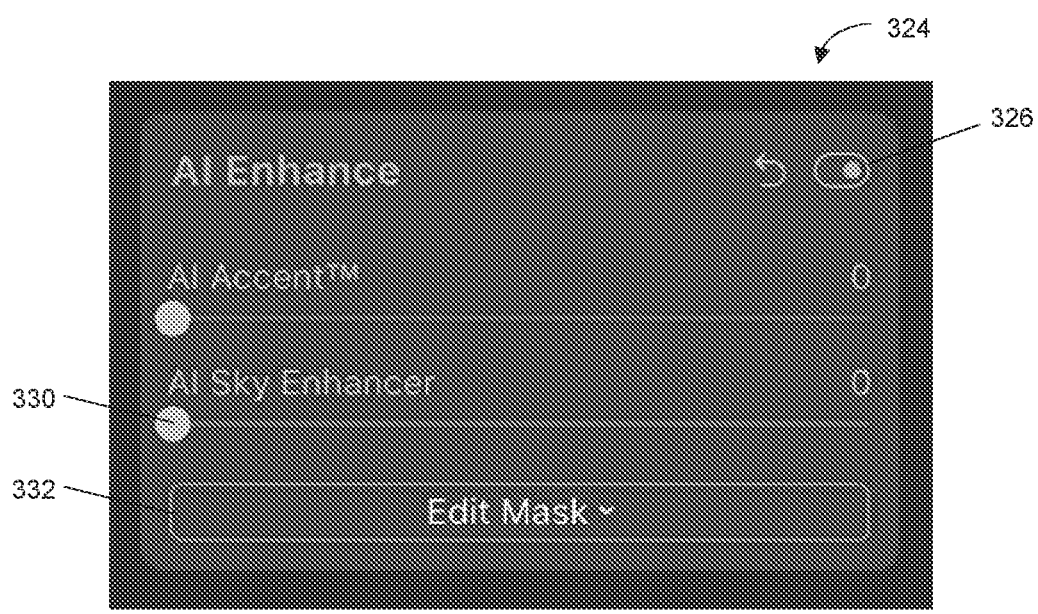
FIG. 35 is an adjustment section of a user interface for an input original image in accordance with the present disclosure.
Figure 36:
FIG. 36 is a user interface including a combined image in accordance with the present disclosure.
Figure 37:
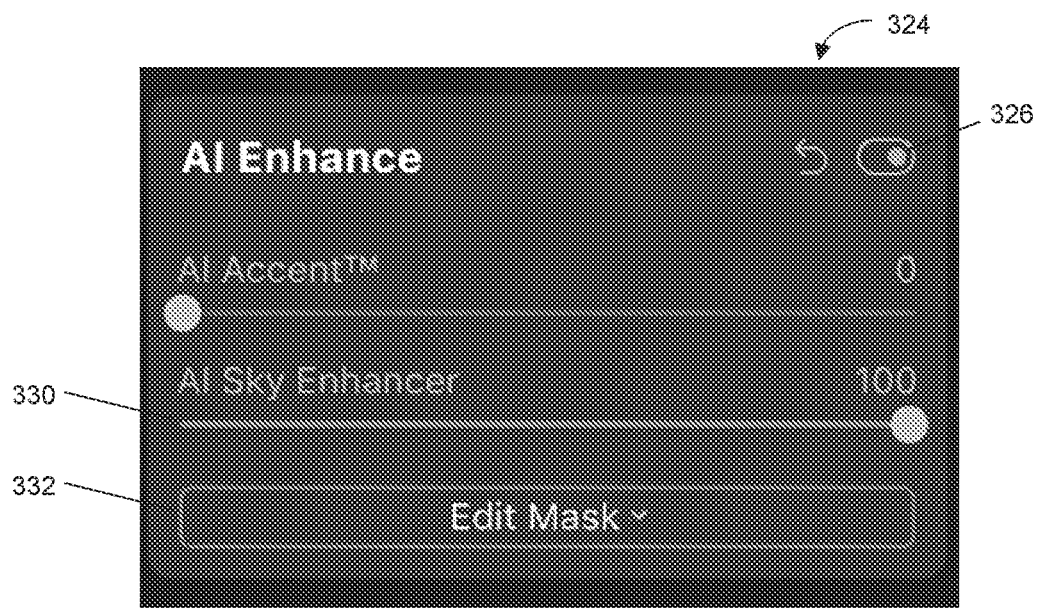
FIG. 37 is an adjustment section of a user interface for a combined image in accordance with the present disclosure.

FIG. 35 is a screenshot illustrating a detailed view of the adjustment section 324 of the user interface 114 for enhancing the sky of an image 170. In some embodiments, the adjustment section 324 can include a single slider 326 for applying the sky enhancement to the image 170. In some embodiments, the adjustment section 324 can include a slider 330 for regulating the strength or intensity of the enhancement. Optionally, the adjustment section 324 includes an edit mask section 332 that can be used to adjust the neural network mask 118. The edit mask section 332 can provide the user with the ability to manually use a brush, gradient and/or radial gradient control to perform manual masking (e.g., adjusting the mask generated by the system 100) for a modification of the enhancement area. However, it should be understood that the system 100 is capable of generating the appropriate mask automatically without manual user input. The enhancement of the image 170 can thereby be easily applied by using a single actuator in the interface 114. In both FIGS. 34-35, the enhancement strength (as indicated by the slider 330) is set to zero (e.g., no enhancement to the image 170). FIGS. 36-37 show the user interface 114 and the detailed view of the adjustment section 324 for a combined image 194, with the slider 330 showing the sky enhancement strength at 100 (e.g., full strength).

In some embodiments, after adjustments have been made to one image to create a final image with an enhanced background, it may be desirable to automatically apply the same enhancements to one or more other input original images 170 in the system 100. The system 100 provides an efficient process for applying or copying the same enhancements to one or more input original images 170 without having to repeat the editing steps again. The user interface 114 includes the image selection section 320 (e.g., an image filmstrip in FIG. 34) or an image context menu (e.g., a gallery view) for viewing multiple edited and unedited images.

Figure 38:
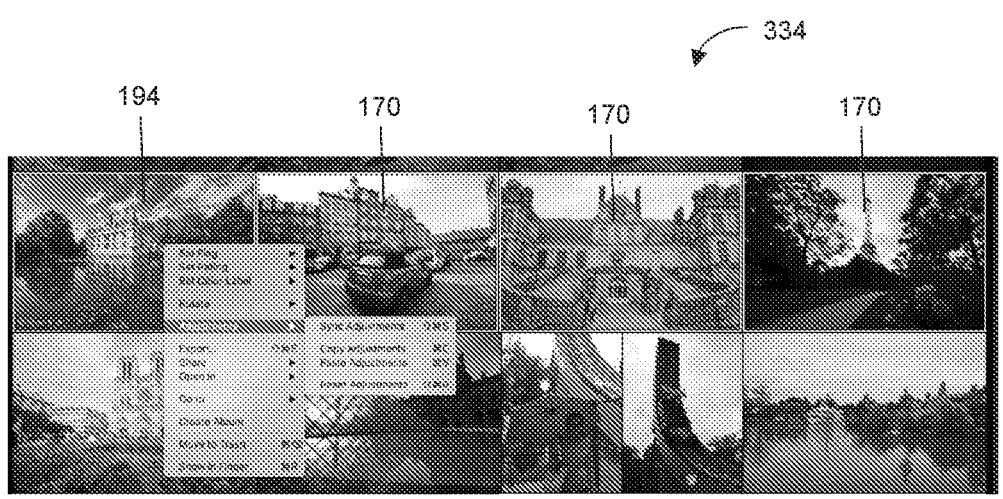
FIG. 38 is an image context menu of a user interface in accordance with the present disclosure.
Figure 39:
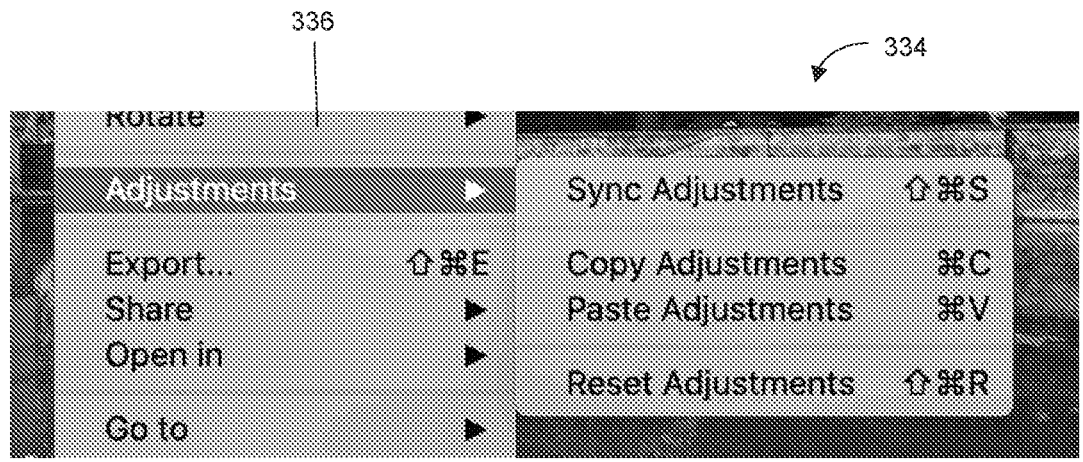
FIG. 39 is a detailed view of an image context menu of a user interface in accordance with the present disclosure.
Figure 40:
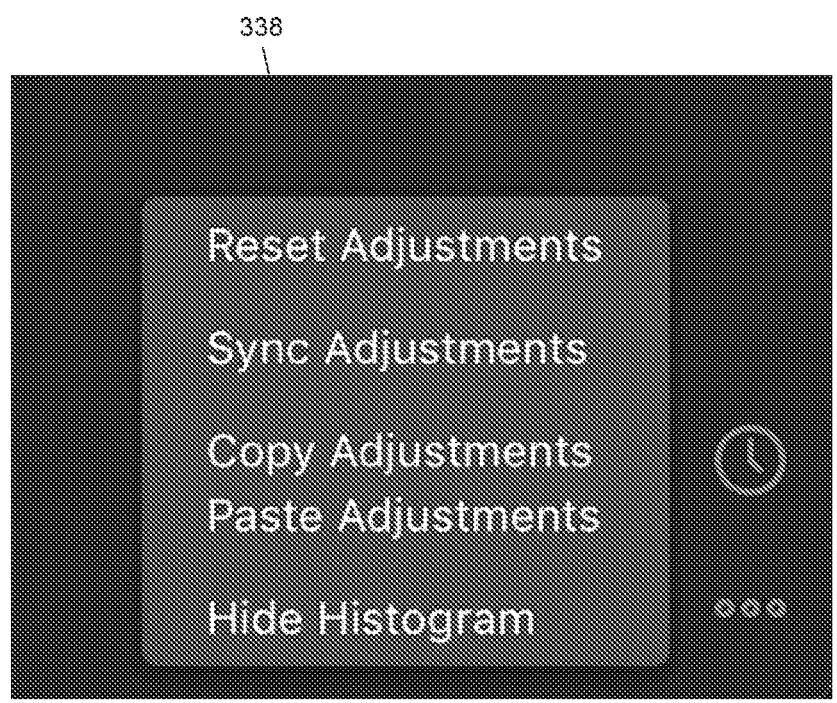
FIG. 40 is a detailed submenu of a user interface in accordance with the present disclosure.

FIG. 38 is a screenshot illustrating a view of an image context menu 334 and FIG. 39 is a screenshot illustrating a detailed view of an image context menu 334 of the user interface 114. The image context menu 334 includes an edited combined image 194 with an enhanced background and multiple input original images 170 with original backgrounds. A submenu 336 can be selected by the user by right-clicking on the combined image 194, choosing adjustments, and copy adjustments to copy the enhancements (including the enhanced background) of the combined image 194. Next, the user can select the input original images 170 in the image context menu 334 for which the same enhancements will be applied and, as shown in FIG. 40, right-clicking on the selected images 170 generates a submenu 338. The submenu 338 can be used to choose copy adjustments to apply or sync the same enhancements to the selected original images 170. In the image selection section 320, a submenu 334 can be generated in a similar manner as described above to copy enhancements of the combined image 194. The process of copying the enhancements to additional original images 170 in the system 100 can thereby be provided in an efficient and convenient manner.

Figure 41:
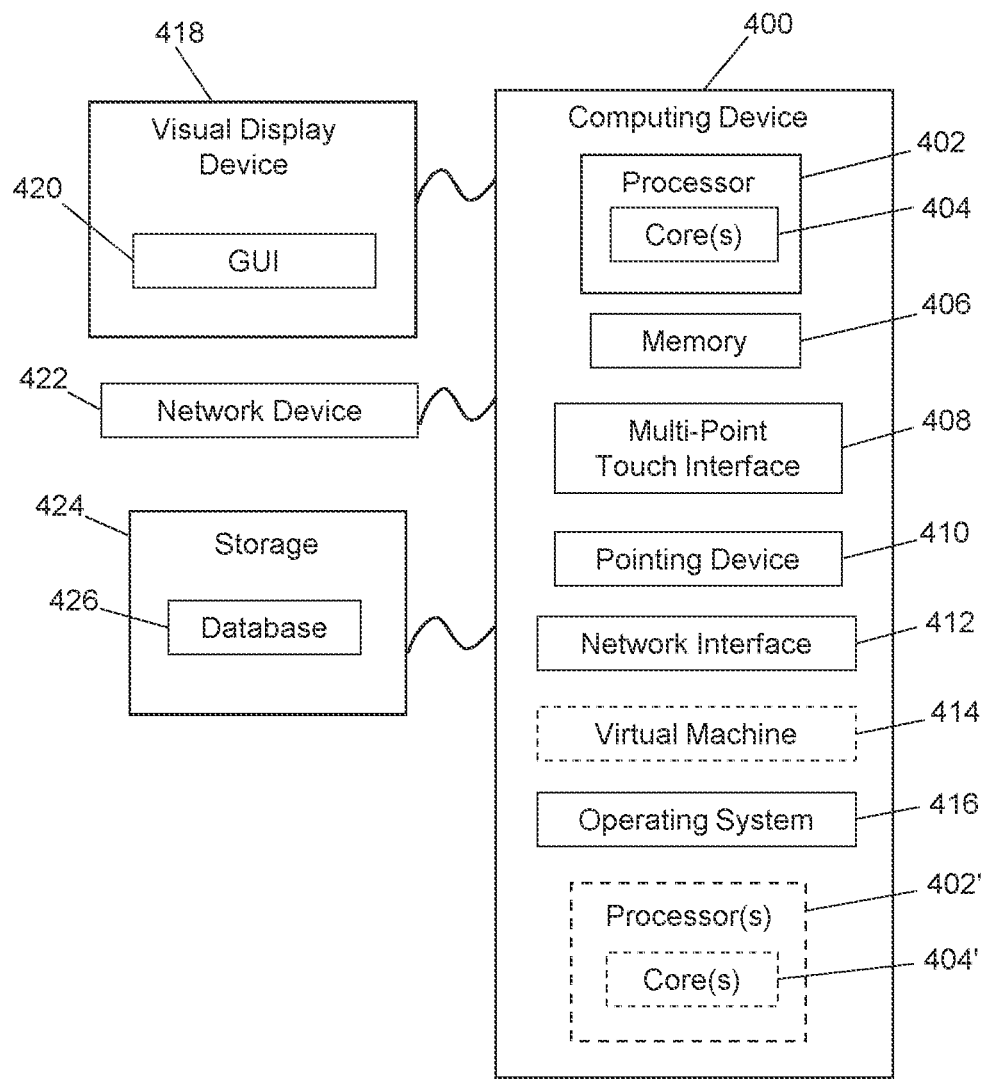
FIG. 41 is a block diagram of an exemplary computing device for implementing the exemplary system for selective enhancement of objects in images in accordance with the present disclosure.

FIG. 41 is a block diagram of a computing device 400 (e.g., a mobile device, a smart device, a computer, or the like) in accordance with exemplary embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the present disclosure (e.g., instructions for operating the camera, instructions for operating the modules, instructions for operating the database, instructions for operating the processing device, instructions for operating the communication interface, instructions for operating the user interface, instructions for operating the central computing system, instructions for operating the neural network, combinations thereof, or the like). The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device 400 may be shared dynamically. A virtual machine 414 may be provided to handle a process running on multiple processors so that the process appears to be using only one computing resource rather than multiple computing resources. Multiple virtual machines may also be used with one processor. Memory 406 may include a computer system memory or random access memory, such as DRAM, SRAM, EDO RAM, and the like. Memory 406 may include other types of memory as well, or combinations thereof.

A user may interact with the computing device 400 through a visual display device 418 (e.g., a personal computer, a mobile smart device, or the like), such as a computer monitor, which may display at least one user interface 420 (e.g., a graphical user interface) that may be provided in accordance with exemplary embodiments. The computing device 400 may include other I/O devices for receiving input from a user, for example, a camera, a keyboard, microphone, or any suitable multi-point touch interface 408, a pointing device 410 (e.g., a mouse), or the like. The input interface 408 and/or the pointing device 410 may be coupled to the visual display device 418. The computing device 400 may include other suitable conventional I/O peripherals.

The computing device 400 may also include at least one storage device 424, such as a hard-drive, CD-ROM, eMMC (MultiMediaCard), SD (secure digital) card, flash drive, non-volatile storage media, or other computer readable media, for storing data and computer-readable instructions and/or software that implement exemplary embodiments of the system described herein. Exemplary storage device 424 may also store at least one database 426 for storing any suitable information required to implement exemplary embodiments. For example, exemplary storage device 424 can store at least one database 426 for storing information, such as data relating to the cameras, the modules, the databases, the central computing system, the communication interface, the processing device, the neural networks, the user interface, combinations thereof, or the like, and computer-readable instructions and/or software that implement exemplary embodiments described herein. The databases 426 may be updated by manually or automatically at any suitable time to add, delete, and/or update one or more items in the databases.

The computing device 400 can include a network interface 412 configured to interface via at least one network device 422 with one or more networks, for example, a Local Area Network (LAN), a Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 412 may include a built-in network adapter, a network interface card, a PCMCIA network card, Pa Cl/PCIe network adapter, an SD adapter, a Bluetooth adapter, a card bus network adapter, a wireless network adapter, a USB network adapter, a modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the tablet computer), mobile computing or communication device (e.g., the smart phone communication device), an embedded computing platform, or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 42:
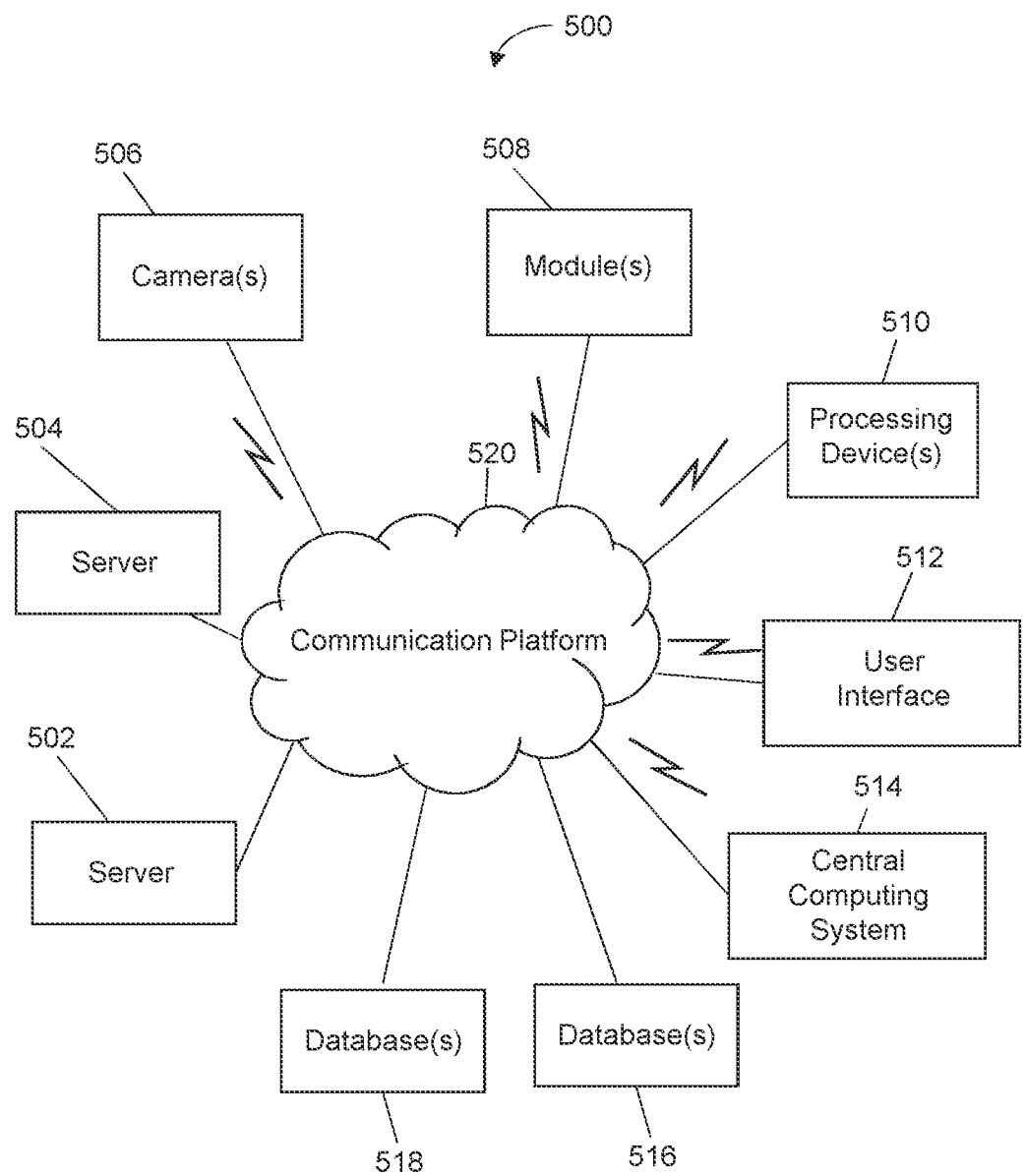
FIG. 42 is a block diagram of an exemplary system for selective enhancement of objects in images environment in accordance with the present disclosure.

FIG. 42 is a block diagram of an exemplary system for selective replacement of objects in images environment 500 in accordance with exemplary embodiments of the present disclosure. The environment 500 can include servers 502, 504 configured to be in communication with one or more cameras 506, one or more modules 508, at least one processing device 510, a user interface 512, and a central computing system 514 via a communication platform 520, which can be any network over which information can be transmitted between devices communicatively coupled to the network. For example, the communication platform 520 can be the Internet, Intranet, virtual private network (VPN), wide area network (WAN), local area network (LAN), and the like. In some embodiments, the communication platform 520 can be part of a cloud environment.

The environment 500 can include repositories or databases 516, 518, which can be in communication with the servers 502, 504, as well as the one or more cameras 506, one or more modules 508, at least one processing device 510, a user interface 512, and a central computing system 514, via the communications platform 520. In exemplary embodiments, the servers 502, 504, one or more cameras 506, one or more modules 508, at least one processing device 510, a user interface 512, and a central computing system 514 can be implemented as computing devices (e.g., computing device 400). Those skilled in the art will recognize that the databases 516, 518 can be incorporated into at least one of the servers 502, 504. In some embodiments, the databases 516, 518 can store data relating to the database 104, and such data can be distributed over multiple databases 516, 518.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method for selective enhancement of an object in an image, the method comprising:
    receiving as input at an interface an original image;
    processing the original image using a neural network to detect one or more objects in the original image, wherein the original image includes a foreground and a background, and wherein the one or more objects include the background of the original image;
    generating a neural network mask of the original image for the one or more objects in the original image;
    applying one or more enhancements to the objects associated with the neural network mask and generating an enhanced image including the one or more enhancements to the objects, wherein applying the one or more enhancements includes:
        generating a refined mask for each pixel of at least the original image associated with the background; and generating a dilated mask including a dilation or indentation from a border extending between the foreground and the background; and generating a combined image, the combined image including the original image combined with the one or more enhancements to the objects of the enhanced image.

2. The method of claim 1, wherein the one or more objects include a sky in the original image.

3. The method of claim 2, further comprising determining a category type of the sky in the original image.

4. The method of claim 3, wherein the category type includes at least one of a blue day sky, a sunset sky, a dawn sky, a cloudy sky, a stormy sky, a night sky, or a foggy sky.

5. The method of claim 1, further comprising generating a blurred mask, the blurred mask including a blur along a border extending between the foreground and the background.

6. The method of claim 1, wherein the one or more enhancements applied to the objects associated with the neural network mask are applied to the background independently from the foreground of the original image.

7. The method of claim 1, wherein the one or more enhancements applied to the objects associated with the neural network mask are applied to the background without affecting the foreground of the original image.

8. The method of claim 1, further comprising generating a saturation corrected image including saturation enhancement of the original image.

9. The method of claim 1, further comprising generating a color improved image including color enhancement of the original image.

10. The method of claim 1, further comprising generating a reduced noise image by reducing noise associated with a night sky in the original image.

11. A non-transitory computer-readable medium storing instructions at least for selective enhancement of an object in an image that are executable by a processing device, wherein execution of the instructions by the processing device causes the processing device to:
receive as input at an interface an original image;
process the original image using a neural network to detect one or more objects in the original image, wherein the original image includes a foreground and a background, and wherein the one or more objects include the background of the original image;
generate a neural network mask of the original image for the one or more objects in the original image;
apply one or more enhancements to the objects associated with the neural network mask and generating an enhanced image including the one or more enhancements to the objects, wherein applying the one or more enhancements includes:
generating a refined mask for each pixel of at least the original image associated with the background; and
generating a dilated mask including a dilation or indentation from a border extending between the foreground and the background; and
generate a combined image, the combined image including the original image combined with the one or more enhancements to the objects of the enhanced image.

12. The non-transitory computer-readable medium of claim 11, wherein the one or more objects include a sky in the original image.

13. The non-transitory computer-readable medium of claim 12, wherein the processing device determines a category type of the sky in the original image.

14. The non-transitory computer-readable medium of claim 13, wherein the category type includes at least one of a blue day sky, a sunset sky, a dawn sky, a cloudy sky, a stormy sky, a night sky, or a foggy sky.

15. The non-transitory computer-readable medium of claim 11, wherein the processing device generates a blurred mask, the blurred mask including a blur along a border extending between the foreground and the background.

16. The non-transitory computer-readable medium of claim 11, wherein the one or more enhancements applied to the objects associated with the neural network mask are applied to the background independently from the foreground of the original image.

17. The non-transitory computer-readable medium of claim 11, wherein the one or more enhancements applied to the objects associated with the neural network mask are applied to the background without affecting the foreground of the original image.

18. The non-transitory computer-readable medium of claim 11, wherein the processing device generates a saturation corrected image including saturation enhancement of the original image.

19. The non-transitory computer-readable medium of claim 11, wherein the processing device generates a color improved image including color enhancement of the original image.

20. The non-transitory computer-readable medium of claim 11, wherein the processing device generates a reduced noise image by reducing noise associated with a night sky in the original image.

* * * * *